(12) United States Patent
Kroupp et al.

(10) Patent No.: US 11,024,114 B2
(45) Date of Patent: Jun. 1, 2021

(54) GAMING SYSTEM WITH PRE-CALIBRATED SENSOR FOR DETECTING CHIP AND FINGER PLACEMENT

(71) Applicant: AGS LLC, Las Vegas, NV (US)

(72) Inventors: Rachel Wolf Kroupp, Las Vegas, NV (US); Ezra Christopher MacKenna, Las Vegas, NV (US); John Victor Zambito, Las Vegas, NV (US)

(73) Assignee: AGS LLC, Las Vegas, NV (US)

(*) Notice: Subject to any disclaimer, the term of this patent is extended or adjusted under 35 U.S.C. 154(b) by 0 days.

(21) Appl. No.: 16/569,342

(22) Filed: Sep. 12, 2019

(65) Prior Publication Data
US 2021/0082226 A1  Mar. 18, 2021

(51) Int. Cl.
*G07F 17/32* (2006.01)
*G06F 3/01* (2006.01)

(52) U.S. Cl.
CPC ............ *G07F 17/322* (2013.01); *G06F 3/017* (2013.01); *G07F 17/3209* (2013.01)

(58) Field of Classification Search
None
See application file for complete search history.

(56) References Cited

U.S. PATENT DOCUMENTS

| | | |
|---|---|---|
| 4,861,041 A | 8/1989 | Jones et al. |
| 5,166,502 A | 11/1992 | Rendleman et al. |
| 5,393,067 A | 2/1995 | Paulsen et al. |
| 5,472,194 A | 12/1995 | Breeding et al. |
| 5,664,781 A | 9/1997 | Feola |
| 5,707,285 A | 1/1998 | Place et al. |
| 5,743,800 A | 4/1998 | Huard et al. |
| 5,911,418 A | 6/1999 | Adams |
| 5,984,779 A | 11/1999 | Bridgeman et al. |
| 6,154,131 A | 11/2000 | Jones, II et al. |

(Continued)

FOREIGN PATENT DOCUMENTS

| | | |
|---|---|---|
| AU | 2015203880 | 7/2015 |
| WO | 2000016868 | 3/2000 |

OTHER PUBLICATIONS

Omaha hold'em—Wikipedia, the free encyclopedia, "https://len.wikipedia_org/w/index.php?title=Omaha_hold_%27em&oldid=722451289", 6 pages, May 28, 2016.

(Continued)

*Primary Examiner* — Jason T Yen
(74) *Attorney, Agent, or Firm* — Weide & Miller, Ltd.

(57) ABSTRACT

Gaming tables that support wager-based gaming are provided with input receiving devices that are structured to intuitively message to players what kind of wagers are permitted at which betting positions and when and then to automatically detect timely placement of such wagers at corresponding betting positions. This allows for faster unfolding of gaming action in that player confusion is minimized with respect to which wagers are being called for, when and where. An integrated compact sensor system is provided occupying slightly more table area than that needed for supporting wagering tokens of different denominations. The sensor system includes a large array of full color pixels (e.g., RGB capable pixels) for messaging to the players and proximity detection functionality for detecting 3D player hand gestures.

31 Claims, 18 Drawing Sheets

(56) References Cited

U.S. PATENT DOCUMENTS

| | | |
|---|---|---|
| 6,186,895 B1 | 2/2001 | Oliver |
| 6,206,373 B1 | 3/2001 | Garrod |
| 6,299,534 B1 | 10/2001 | Breeding et al. |
| 6,464,584 B2 | 10/2002 | Oliver |
| 6,637,747 B1 | 10/2003 | Garrod |
| 6,659,875 B2 | 12/2003 | Purton |
| 6,929,264 B2 | 8/2005 | Huard et al. |
| 7,566,274 B2 | 7/2009 | Johnson et al. |
| 7,651,394 B2 | 1/2010 | Johnson |
| 7,931,532 B2 | 4/2011 | Johnson |
| 8,740,692 B2 | 6/2014 | Yoseloff et al. |
| 8,961,298 B2 | 2/2015 | Czyzewski et al. |
| 9,165,420 B1* | 10/2015 | Knust ................. G07F 17/3241 |
| 9,478,099 B2 | 10/2016 | Czyzewski et al. |
| 9,536,379 B2 | 1/2017 | Czyzewski et al. |
| 9,662,563 B2 | 5/2017 | Van Asdale et al. |
| 9,811,980 B1 | 11/2017 | Kowalchuk et al. |
| 10,204,486 B2 | 2/2019 | Van Asdale et al. |
| 10,395,470 B2 | 8/2019 | Czyzewski et al. |
| 10,769,892 B2 | 9/2020 | Abrahamson |
| 2001/0031659 A1 | 10/2001 | Perrie et al. |
| 2002/0195773 A1 | 12/2002 | Dunn |
| 2003/0153377 A1 | 8/2003 | Lisowski, Sr. |
| 2004/0061288 A1 | 4/2004 | Snow |
| 2004/0090005 A1 | 5/2004 | Snow |
| 2004/0183254 A1 | 9/2004 | Schlumbrecht |
| 2005/0107148 A1 | 5/2005 | Webb |
| 2007/0126186 A1 | 6/2007 | Crawford |
| 2010/0087241 A1* | 4/2010 | Nguyen ............... G07F 17/3225 463/17 |
| 2010/0113120 A1 | 5/2010 | Snow |
| 2011/0034237 A1 | 2/2011 | Schulhof et al. |
| 2011/0309578 A1* | 12/2011 | Lambert ................. G07F 17/32 273/274 |
| 2011/0316233 A1 | 12/2011 | Hong et al. |
| 2012/0083341 A1 | 4/2012 | George et al. |
| 2012/0122559 A1* | 5/2012 | Kelly .................. G07F 17/3232 463/25 |
| 2012/0244924 A1 | 9/2012 | Willis |
| 2013/0157752 A1 | 6/2013 | Yoseloff |
| 2014/0200071 A1 | 7/2014 | Czyzewski et al. |
| 2015/0018083 A1* | 1/2015 | Czyzewski ......... G07F 17/3248 463/25 |
| 2015/0199871 A1 | 7/2015 | Czyzewski et al. |
| 2015/0379821 A1 | 12/2015 | LaDuca |
| 2017/0039799 A1 | 2/2017 | Czyzewski et al. |
| 2017/0193755 A1 | 7/2017 | Hemberger et al. |
| 2017/0203198 A1 | 7/2017 | Lysowski et al. |
| 2017/0323530 A1 | 11/2017 | Hemberger et al. |
| 2018/0122187 A1* | 5/2018 | Moore ................. G07F 17/3248 |
| 2019/0108710 A1* | 4/2019 | French ................. G07F 17/3223 |
| 2019/0251781 A1* | 8/2019 | El Kai ................ G07F 17/3213 |
| 2020/0074810 A1* | 3/2020 | Johnston ............. G07F 17/3293 |
| 2020/0209955 A1* | 7/2020 | Guerriero ............. G06F 3/0354 |

OTHER PUBLICATIONS

State of Washington Gambling Commission, "Mississippi Stud Training Manual," "http://www.wsgc.wa.gov/activities/game-rules/mississippi-stud.pdf, Oct. 28, 2014, 17 pages.
State of Washington Gambling Commission, "Texas Hold 'Em Bonus Training Manual," "http://www.wsgc.wa.gov/activitiesigame-rules/texas-hold-em-bonus.pdf, Oct. 28, 2014, 15 pages.
State of Washington Gambling Commission, "Ultimate Texas Hold 'Em Training Manual," "http://www.wsgc.wa.gov/activities/game-rules/ultimate-texas-hold-em.pdf. Aug. 11, 2014, 23 pages.
Texas Hold 'Em—Wikipedia, the free encyclopedia, "https://en_wikipedia_org/w/index.php?title=Texas hold_%27em&oldid=718982670", May 6, 2016, 18 pages.
International Search Report and Written Opinion for Application No. PCT/US2017/031511, dated Aug. 7, 2017, 19 pages.
International Search Report and Written Opinion for Application No. PCT/US2017/031560, dated Aug. 9, 2017, 20 pages.
Shanghai Lanbao Sensing Technology Co., Ltd. "CR30S-Products, "http:www.shlanbao.cn/en/product/show.aspx?id=1139, Copyright 2011, printed Oct. 21, 2016, 2 pages.
STMICROELECTRONICS, "VL6180X-Proximity sensor, gesture and ambient light sensing "ALS" module, "http://www. st.com/en/imaging-and-photonics-solutions/v16180x.html, Copyright 2016, printed Oct. 21, 2016, 6 pages.
International Search Report and Written Opinion for PCT/US2017/012156 dated Mar. 13, 2017, 27 pages.
Notice of Allowance and Fees Due dated Apr. 22, 2019 in U.S. Appl. No. 15/149,410, 11 pages.
Non-Final Rejection dated Nov. 27, 2018 in U.S. Appl. No. 15/149,410, 9 pages.
Non-Final Rejection dated Nov. 27, 2017 in U.S. Appl. No. 15/149,410, 31 pages.
Final Rejection dated Jun. 28, 2018 in U.S. Appl. No. 151149,410, 11 pages.
Amendment dated Feb. 22, 2019 in U.S. Appl. No. 15/149,410, 10 pages.
Amendment dated Sep. 18, 2018 in U.S. Appl. No. 15/149,410, 11 pages.
Amendment dated Feb. 26, 2018 in U.S. Appl. No. 15/149,410, 14 pages.
Avago Technologies, "APDS-9960 Digital Proximity, Ambient Light, RGB and Gesture Sensor", Nov. 13, 2015, 38 pages.
Normand, "WS2812B-Mini Intelligent external control LED Integrated light source", www.normandled.com, Jul. 10, 2016, 5 pages.

* cited by examiner

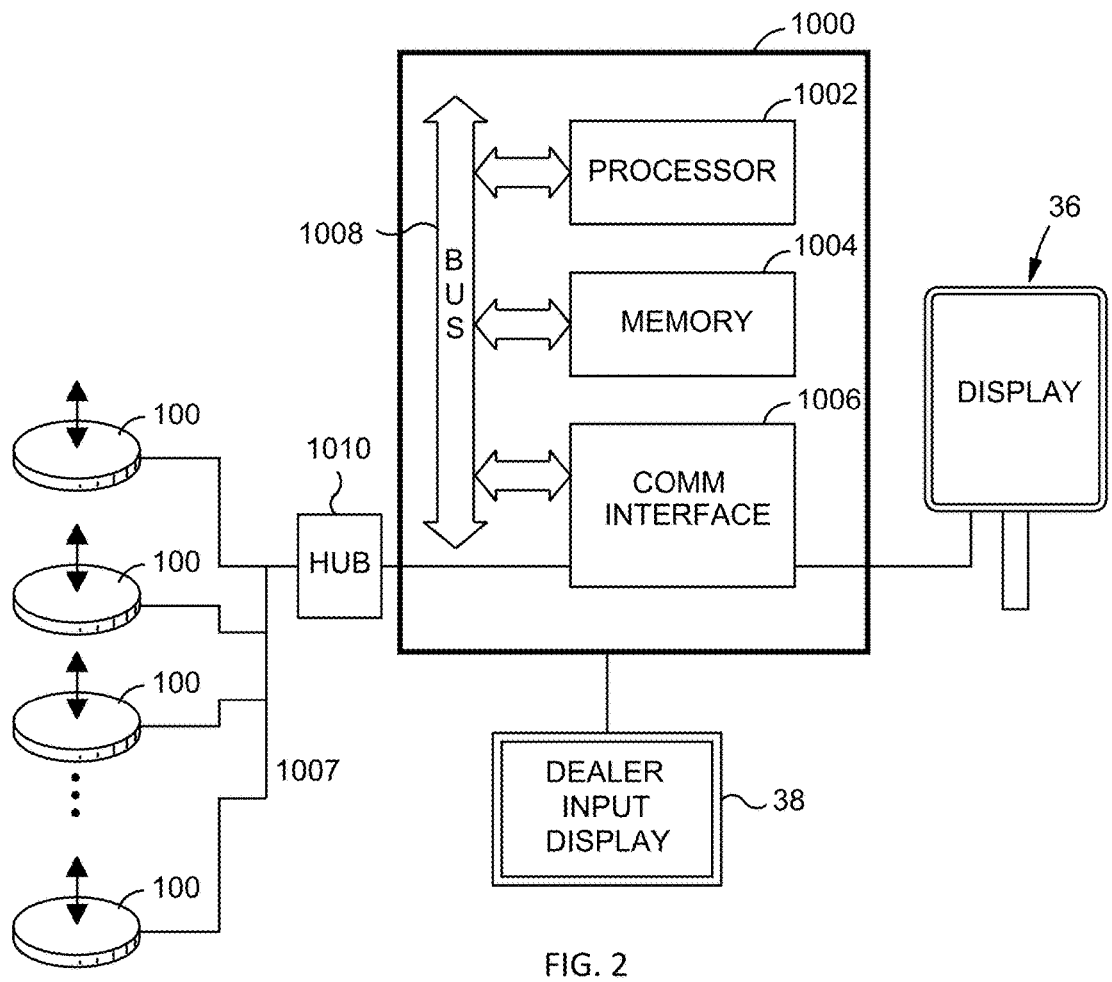
FIG. 2
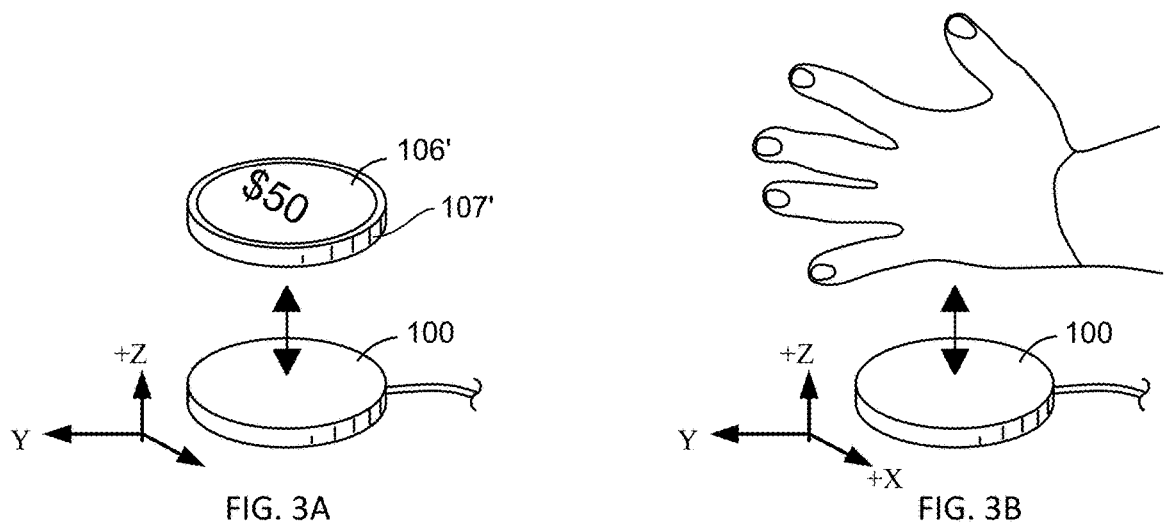
FIG. 3A
FIG. 3B

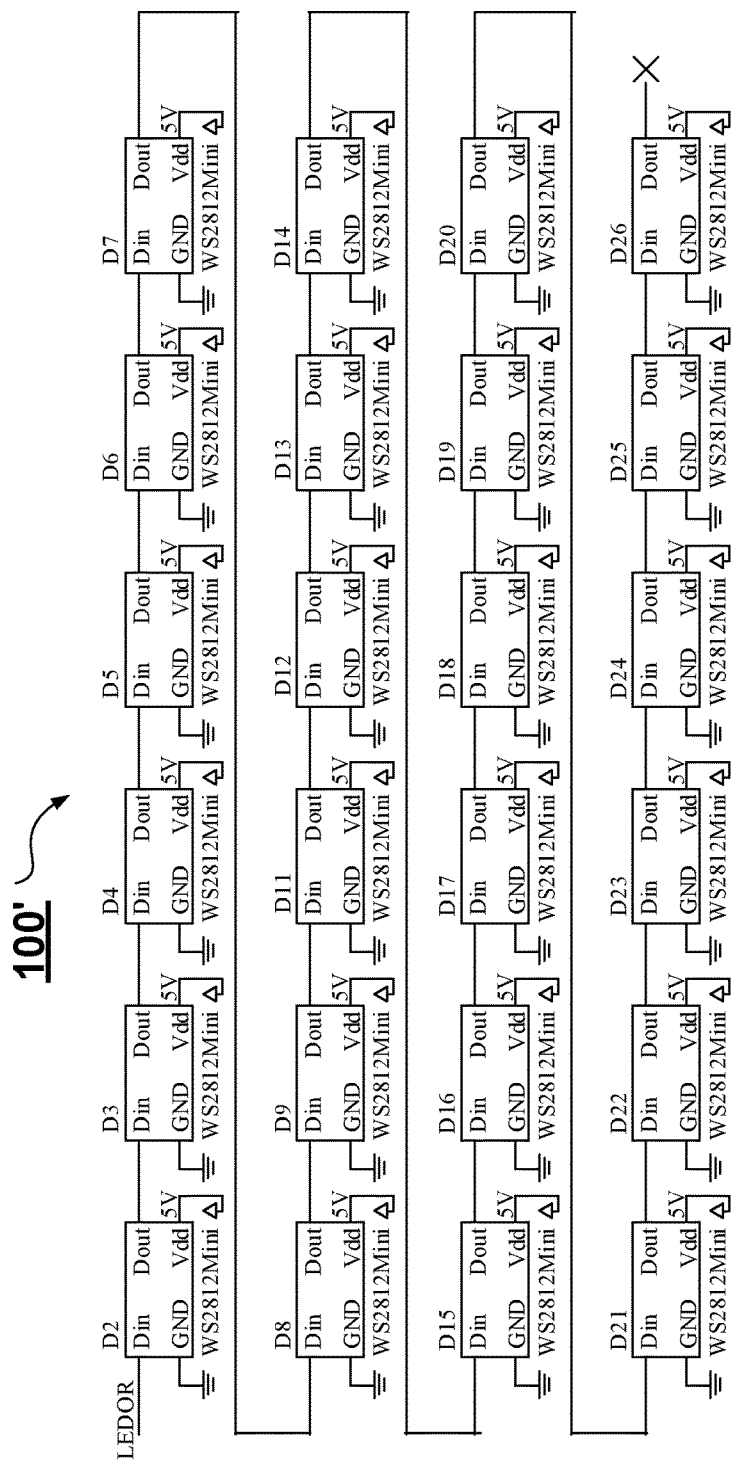

US 11,024,114 B2

GAMING SYSTEM WITH PRE-CALIBRATED SENSOR FOR DETECTING CHIP AND FINGER PLACEMENT

TECHNICAL FIELD

The present disclosure of invention relates to operations of a gaming action support machine and certain associated equipment within a gaming environment.

BACKGROUND

Wagering games typically involve at least some amount of luck in predicting a chance outcome (e.g., a randomized dealing out of playing cards from one or more decks of playing cards, a chance landing of a Roulette ball on compartmentalized sector of a Roulette wheel, etc.). Such games may also involve varying amounts of skill in determining when to wager, when to abstain and how much to wager on which wagering opportunities including on so-called, side bets. Table-based wagering games typically feature one or more players plus a dealer (human or automated) placed about a game-supporting horizontal table where the chance event or events to be wagered on unfold on the table top (and optionally on a computer screen viewable to all the players). Such table-based games may include, as non-limiting examples, blackjack, poker, baccarat and other types of card, tile and/or chip using games, as well as roulette, craps and other types of dice-using games. Such table-based games may allow active players to place side bets on a specific community outcomes that may unfold by chance for all involved around the table. It is important that players place their respective and different kinds of wagers (e.g., base ante, bonus wager, side bet) at the right time and in the right place. In fast paced games, some players may become confused as which kind of wager is required or permitted over what wager-detecting places and when such wagers are or are not permitted. This is a problem.

It is to be understood that the gaming table environment is not merely a machine-like physics experiment in chance outcomes. Instead, it often involves social engagement between the various players located around the table, the dealer (or dealers if plural) and bystanders who may be watching the gaming action. Enjoyment and excitement of the various participants can be enhanced by allowing for rapid unfolding of gaming results, requiring timely placement or pull-out of bets, allowing for occasional winning of large jackpot prizes and/or bonus games, allowing for chance dispersal of awards (e.g., community prizes) to more than just a one player who may have won a current round, display of interesting light patterns and production of game-related sounds.

One class of table-based games utilizes a relatively large video or other electronic display monitor mounted on or near the table so that players (and optionally bystanders behind them) can easily see parts of the gaming action. The monitor displayed gaming action may include showing a wheel of chance, showing its spin motions and the possible results that may ensue from the wheel stopping its spin so that a specific pie slice or other like segment of the wheel is selected (e.g., pointed to) as the spin outcome. The spinning of the wheel and the displayed possible outcomes adds a sense of excitement and expectation for players (and for bystanders). Monitor displayed gaming action may alternatively or additionally show the current amount of a pending jackpot prize and/or amounts that various players are currently wagering on respective gaming action outcomes.

In order to allow for real time displaying of player actions and allow for rapid progression from one gaming round to the next, electronic chip sensors are routinely used in table-based games. One example of an electronic chip sensor is disclosed in U.S. Pat. No. 5,393,067 issued to Paulsen, et al. on Feb. 28, 1995 and entitled "System, method and apparatus for generating large jackpots on live game card tables". In Paulson, a low profile electro-optical sensor disc has a centrally mounted photo sensor for detecting when a coin is timely placed over the center by a respective player to thus cut off ambient light. This is used to detect the placement or not of a wager of fixed amount represented by the coin. In an area not covered by a placed coin, a light source, such as a LED, functions as a visual "Coin Accepted Indicator". Once the dealer notes that the light source is lit before gaming action begins, the dealer can lock in the bet and at the same time cause the sensor light source to remain lit. Then the dealer removes the coin from the table while the light source remains lit. Thus players cannot withdraw their wagers as the gaming action commences and everyone sees which such coin-based wagers (e.g., jackpot side wagers) are on the table.

Another example of a table-based coin sensor is disclosed in U.S. Pre-grant Pub. 2012-0122559 to Kelly, et al. published May 17, 2012 and entitled "WAGER RECOGNITION SYSTEM". Rather than relying on the cut-off of ambient light from above, a set of modulated and narrow band IR LEDS is placed below the coin/token acceptance area. When the coin/chip is placed there, the modulated IR light is reflected to a central sensor for detection of the reflected modulated light as being distinct from any overhead ambient light. Red LEDs surrounding outside the coin/chip receiving area light up to indicate coin acceptance. Coin sensing information is serially transmitted.

It is to be appreciated that while players enjoy the more well-known table-based games, they continue to seek new games that provide variety of gaming action, greater excitement and heightened expectations of larger payouts and more entertaining light displays. However, development of new and successful games is complex. A myriad of intertwined criteria are involved. For example, table surface area is limited. Players desire games which are sufficiently challenging to retain their interest, but yet not too challenging (e.g., too confusing) to play or difficult to learn. Human to machine interfacing should appear to be intuitive. Players may desire wagering games where the wagers are structured in a way in which they increase the tension and excitement of the game, but yet without the wager and payout structures being too complex and thus difficult to understand. In addition, the game must be configured so that it not only offers an apparently reasonable rate of return and/or chance to win to the players, but also assures the house a reasonable rate of return on the playing of a large number of the games. With these and other objectives in mind, the here disclosed improvements have been developed.

It is to be understood that some concepts, ideas and problem recognitions provided in this description of the Background may be novel rather than part of the prior art.

SUMMARY

Embodiments in accordance with the present disclosure of invention comprise structures and methods of intuitively messaging to players what kind of wagers are permitted (or required) where and when during a fast unfolding game and of automatically detecting player signaling of wager placement and other player selections (e.g., player hand gestures) by way of an integrated compact mechanism that does not consume excessive surface area on a gaming table. More specifically, a sensor system occupying slightly more table area than that needed for supporting chips of different denominations is provided. The sensor system allows for intuitive messaging to players by use of a large array of full color pixels (e.g., RGB capable pixels) and for player selection by way of 3D finger or hand gestures and for placing of bets of different denominations while providing players with entertaining feedback light patterns of many colors.

One embodiment provides a machine-assisted method of managing a game of chance played by one or more players at a gaming table having plural betting positions where the provided method comprises: (a) while a predetermined first time window is open for receiving at least a first wager of a first round of the game, using a respective pre-calibrated proximity detecting integrated circuit (Px IC) provided at each respective betting position to automatically detect if a corresponding first wager token has been placed at one or more of the respective betting positions as the first wager; and (b) at the close of the predetermined first time window, causing a respective plurality of multi-colored light emitters provided at each of the respective betting positions where placement of a corresponding first wager token has been detected to output a respective light pattern indicating that the corresponding first wager has been accepted at that respective betting position.

One embodiment provides a machine system for managing a game of chance played by one or more players at a gaming table having plural betting positions, where the system comprises at each betting position: (a) wager placement detecting means for automatically detecting if a corresponding first wager token has been placed at the respective betting position as the first wager while a predetermined first time window is open for receiving at least a first wager of a first round of the game, the wager placement detecting means including a respective pre-calibrated proximity detecting integrated circuit (Px IC); and (b) game state signaling means for signaling to the player of the respective betting position that a corresponding first wager token has been detected and accepted, the game state signaling means including a respective plurality of multi-colored light emitters operable to output differently colored light patterns.

Further aspects, features, and advantages of embodiments provided in accordance with the present disclosure of invention will become apparent from the below detailed description and associated drawings.

BRIEF DESCRIPTION OF THE DRAWINGS

FIG. 2 illustrates a machine-based gaming system in accordance with one embodiment of the present disclosure.

FIGS. 3A and 3B illustrate first and second inputs to an input receiving device in accordance with the present disclosure.

DETAILED DESCRIPTION

In the following description, numerous specific details are set forth in order to provide a more thorough description of illustrative embodiments in accordance with the present disclosure of invention. It should be apparent, however, to those skilled in the art, that the illustrative embodiments are not limiting and the teachings of the present disclosure may be practiced in other ways without need for one or more of the specific details. In other instances, well-known features have not been described in detail so as not to obscure the disclosure.

Figure 1A:
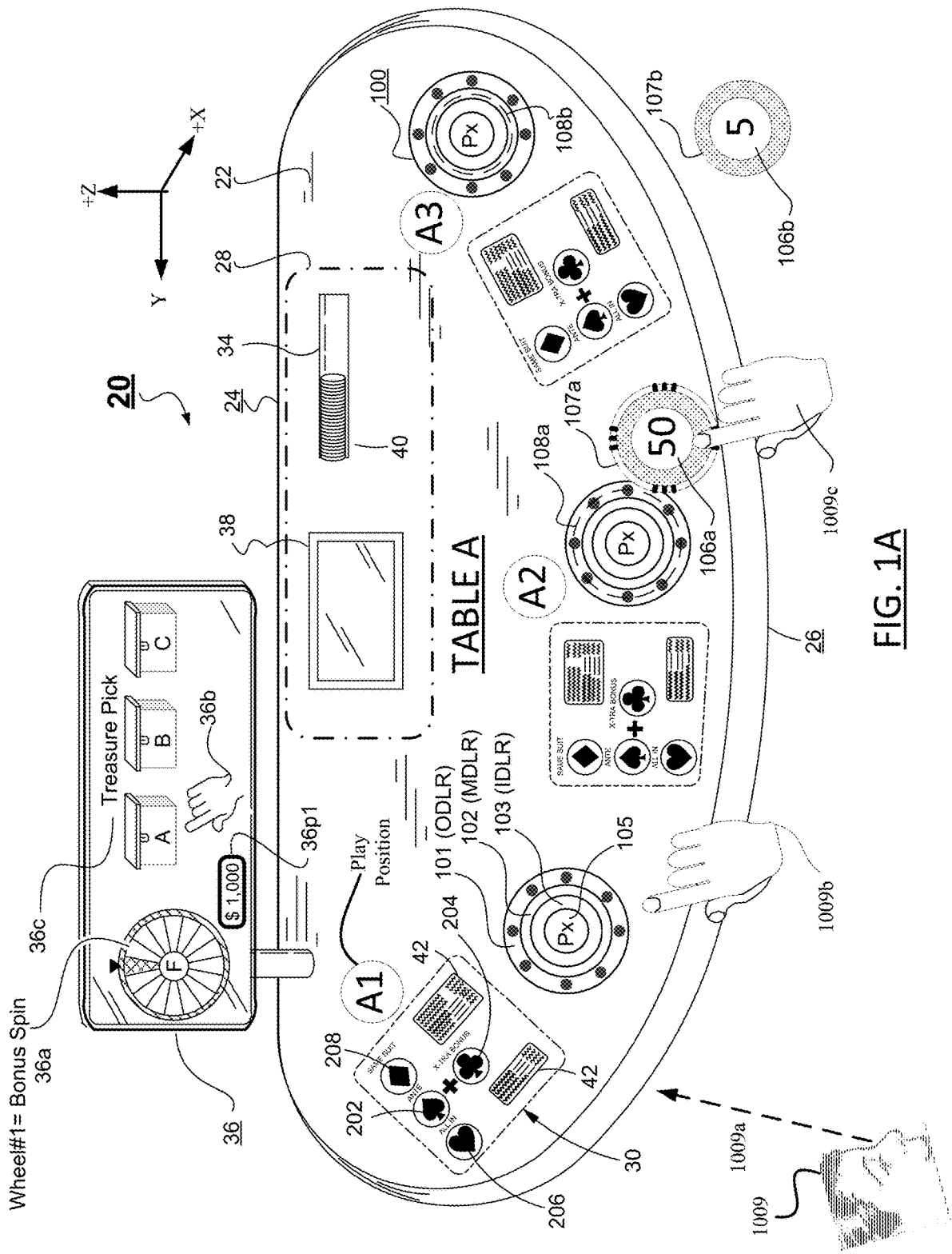
FIG. 1A illustrates a gaming table in accordance with one embodiment of the present disclosure of invention.

One embodiment of a gaming table in accordance with the present disclosure of invention will be described with reference to FIG. 1A. As illustrated in FIG. 1A, a horizontal game playing surface, such as a gaming table 20, is provided. The gaming table 20 includes a top or playing surface 22, typically a textured, contoured and/or marked playing surface 22. The gaming table 20 may include one or more supports, such as a base, legs or the like (not shown) via which the playing surface 22 is elevated above a supporting surface such as a casino gaming floor. Although not shown, secured electronic communication and power cables may extend through one or more of the table supports to connect with casino electronic networks and power distribution means provided under the casino gaming floor.

The shape of the playing surface 22 may vary. In one embodiment, the gaming table 20 has a rear (−X direction), dealer's side edge 24 which is generally straight. The table 20 further has an opposed front (+X direction) edge 26 which is generally arcuate. Resilient bumpers or cushions may be located about either or both edges 24, 26. Players such as 1009 (only one shown) typically position themselves distributively about the arcuate front edge 26 to align with marked player positions (e.g., A1, A2, A3) while a casino dealer (not shown) typically positions him or herself behind the rear edge 24.

In one embodiment, the playing surface 22 is predominantly planar. However, the playing surface 22 could have one or more raised areas and/or one or more depressed areas or other features which are integrated into the table or added to the table, such as by being located on or mounted to the top surface thereof. Various game-related information or features may be associated with the gaming table 20. In one embodiment, the playing surface 22 comprises a gaming felt or similar element(s) which are located over a substrate, such as a planar support. The gaming felt may bear game play information or other information, such as by printing on the felt. This information may vary, depending upon the game or games which are to be implemented at the gaming table 20. For example, printing on the gaming felt may comprise one or more payout schedules or tables 42, marking for where cards are to be located and other such markings. Specific details (e.g., 202-208) about one embodiment will be provided further below.

In one embodiment, the configuration of the gaming table 20, such as via elements which are associated with the table 20 and information printed on the gaming felt, defines a dealer station 28 from where a dealer may run a game, and one or more player positions 30 (e.g., denoted as A1, A2, A3 of Table A). The dealer station 28 is generally located by the rear edge 24 while the player positions 30 are located along the front edge 26 opposite to the dealer station 28. The dealer may, for example, stand at the rear of the table adjacent to the dealer station 28. Each respective player (e.g., 1009) may stand or sit adjacent to a respective player position marking 30 provided on the gaming table 20.

In one embodiment, at least one game which is played at the gaming table 20 is a wagering game. Wagers may be placed by moving physical gaming chips (e.g., 106a, 106b) or other elements into predetermined wager indicating positions. In one embodiment, the chips have at least one of color codings at their rims and/or underneath sides and RFID or like transponders embedded in them. Wagers placed by players as well as the amounts of the wagers may be automatically sensed by detecting the colored rim/underneath color codings and/or the chip-embedded RFID or like transponders associated with the respective gaming chips (or other wagering implements) as they are placed in proximity with one or more input receiving devices or input sensors 100. For the illustrated embodiment 20, the input receiving devices or input sensors 100 are structured to each include at least three annular rings of multi-color visible light sources denoted as 101 (outer diameter light ring or ODLR), 102 (median diameter light ring or MDLR) and 103 (inner diameter light ring or IDLR). It is within the contemplation of the disclosure to have a greater or lesser number of such rings of visible light sources and/or to use various regular geometric shapes for one or more of the rings other than circular, for example hexagonal, octagonal, elliptical, etc.

At the center of each input sensor 100 is a three-dimensional object proximity detector denoted as 105 and also as Px. The proximity detector 105 is configured to distinguish between a player's hand 1009b approaching or passing by it and a circular disc-like wagering coin or token 106a (or 106b) passing by or over it in (e.g., as slid thereto by player's hand 1009c). In one embodiment, the outer rims 107a (or 107b) and or underneath faces (not shown) of the wagering tokens are color-coded to define the amounts being wagered. In one embodiment, the tokens are sized to have a cylindrical outer diameter that are slightly smaller than a respective one of the outer diameter (OD) of the ODLR 101 and the outer diameter (OD) of the MDLR 102 of the corresponding input sensor 100. One or the other of the ODLR 101 and the MDLR 102 may be flashed on an exclusive basis to indicate which of the differently sized tokens is required or permitted to be placed there at specific time within the gaming activity. Such dimensioning allows lights from the ODLR 101 or the MDLR 102 (whichever is selected by the software) to be viewed as fully surrounding the outer rim 107a (or 107b) when the right-sized token 106a (or 106b) is centrally placed over the sensor area 100. It is within the contemplation of the disclosure to use various regular geometric shapes for one or more of the wagering tokens other than circular, for example hexagonal, octagonal, elliptical, etc. to match the dimensions and shapes of one or more of the more outer rings (e.g., 101, 102) of the visible colored light sources 101-103. The three dimensional object proximity detector 105 is configured to be able to detect and distinguish among various color coding provided on the outer rim 107a, 107b and/or underneath face of each kind of token 106a, 106b for determining what type of token has been placed and also for determining is right kind of token has been placed within a predetermined permission-giving time window (e.g., before the dealer closes the option for placing that kind of wager). Dashed circle 108a at betting position A2 indicates where the outer rim 107a of token 106a would reside if placed centrally over that corresponding input sensor 100. Dashed circle 108b at betting position A3 indicates where the outer rim 107b of token 106b (latter not to scale) would reside if placed centrally over that corresponding input sensor 100. In one embodiment, the outer diameter of each input sensor 100 is slightly larger than 2.12 inches (e.g., it is 2.25 inches when including its structural containment bezel—not shown—in the measurement).

The three dimensional object proximity detector 105 is further configured to be able to detect and distinguish among various gestures made by the player's hand or fingers 1009b as will be further detailed below. The detected hand gestures may be used to operate an on-screen cursor object 36b (e.g., displayed as a hand icon on the players' screen 36) for selectively actuating an on-screen wheel of chance 36a (causing it to spin and/or stop) and/or for selectively picking among on-screen options (e.g., treasure chests A, B or C). More details about the proximity detector 105 will be provided later below.

Optionally, the gaming table 20 may have additional button shaped other input devices (wired or wireless, not shown) that are alternatively actuated by the placed chips and/or by the player. However, for one class of embodiments, such additional other input devices not be included so as to avoid confusion by players. Instead, the multi-ring, multi-color emitting input sensors 100 are the only ones drawing the attention of players as needed and indicating to the players what kinds of inputs are allowed or necessary or not allowed at various times based on the light patterns generated by those respective multi-ring, multi-color emitting input sensors 100. In the case where the additional other sensors (not shown) are nonetheless used, the other sensors may include any type of proximity sensor including, but not limited to, magnetic, electromagnetic (e.g., RFID), IR, acoustic, capacitive, or the like. For example, the additional other input receiving devices (not shown) might comprise capacitive type sensors such as Lanbao CR30S™ series capacitive sensors (produced by Shanghai Lanbao Sensing Technology Co.; www.shlanbao.cn), which sensors behave as standard electrical 4-pin switches where the switch status changes when a chip (or other object, such as a player's hand) is placed on it. In another embodiment, the additional other input receiving devices or sensors (not shown) might comprise light sensing devices which measures the distance between the sensor and a chip (or other object, such as a player's hand), such as the VL6180X™ ambient light sensing proximity sensor produced by STMICRO (www.st-.com).

In one embodiment, one or more of the primary input receiving devices 100 are each associated with a respective player position 30 (e.g., A1, A2, A3), thereby providing a simple and intuitive means for each player to provide inputs relative to game play at that betting position (e.g., A1, A2, A3) of the gaming table. The input receiving devices 100 are operatively coupled to an electronic game controller (not shown—see instead FIG. 2) such that wagers may be easily placed, automatically detected and locked-in without need for verbal communication.

In one embodiment, the dealer station 28 may include one or more chip trays 34 which are located on or at the gaming table 20 for storing chips 40 which may be used to pay player winnings and/or in which chips which were used by players to place wagers may be collected by the dealer (e.g., after their corresponding bets are locked-in as indicated by predetermined light output patterns of one or more of the annular rings of the multi-color visible light sources 101, 102, 103.

In one embodiment, the gaming table 20 may include a number of other features. For example, the gaming table 20 may include one or more above-the-table displays 36 (above the table as measured along an orthogonal Z axis). The above-table displays (e.g., 36) may comprise one or more single or double sided electronic image displays (such as an LCD, LED, OLED, DLP or other types of displays) or might even comprise mechanical and/or electro-mechanical display devices such as one or more mechanical spinning wheels or reels. The above-table display 36 may be located at or near the gaming table 20 for use in displaying game related information such as pay table information, game status information, game outcome information, bonus information or the like. All players (e.g., 1009) about the table have an unobstructed line of sight 1009a to the displayed imagery. The table display 36 might also be used to display promotional information (e.g., reward possibilities) or advertising. In one embodiment, a larger slave copy of the main above-table display 36 may be located on a wall near the table so that on-lookers can easily view the gaming action as it develops at the corresponding table. In one embodiment, movement of each player's hand cursor 36b is viewable on the larger slave copy of the main above-table display 36 where that viewable movement may include placement of bets of different denominations (e.g., $5, $50, $100).

The gaming table 20 might also comprise or include various further input devices and/or other display devices. The further input devices might include one or more dealer-controlled input devices such as one or more buttons and/or a dealer-controlled touchscreen display 38. For example, the dealer display 38 might comprise a display which displays game-related information to the dealer and allows the dealer to provide various inputs. Of course, various other types of input and display devices might be associated with the gaming table 20. The gaming table 20 might also include player-controlled touch-screens, inputs buttons or the like.

Additional details of a gaming table in accordance with one embodiment of the invention will be described with reference to FIG. 2. As illustrated, in this embodiment, elements of the gaming table 20 are associated with or connected to at least one table controller 1000. The table controller 1000 may be located at the gaming table 20 or may be remote therefrom; for example protectively secured in a locked cabinet elsewhere in the casino.

In one embodiment, the table controller 1000 comprises one or more instructable data processing units (e.g., CPU's. GPU's etc.) typically referred to as processors 1002 (only one shown) which is/are configured to execute respective data processing and data input/output operations in accordance with non-transitory machine readable code fixed in a tangible medium (e.g. "software"). The table controller 1000 may also comprise one or more information or data storage devices 1004 (only one shown). These data storage devices 1004 may comprise any type of data storage device such as on or off chip cache, ROM, RAM, EPROM or the like, as well as mass storage devices such as hard drives. The data storage devices 1004 may store various data, including game code or software which is executable by the processor(s) 1002 and other data, such as game data including wager data, game outcome data, images, etc.

The table controller 1000 includes one or more communication interfaces 1006 (only one shown). The communication interface(s) 1006 may facilitate wireless and/or wired communications with one or more remote systems or devices in accordance with various protocols (USB, Wi-Fi, Bluetooth, Ethernet, Firewire, etc.). In one embodiment, data or information may be exchanged between the processor(s) 1002, data storage device(s) 1004 and communication interface(s) 1006 via one or more data exchange fabrics, such as a system bus 1008. Of course, the table controller 1000 might have other configurations, including other elements or features.

As illustrated in FIG. 2, the one or more primary input receiving devices 100 of the gaming table 20 may be operatively coupled with the table controller 1000 so that the table controller 1000 may receive information from those devices 100 and, in some embodiments, may also transmit information (e.g., desired light patterns for the visible light emitting rings 101, 102, 103) to those devices Likewise, the dealer input and/or display devices, such as the dealer touchscreen 38, may be interfaced to the table controller 1000. Also, other input and/or display devices such as the table display 36 may be interfaced to the table controller 1000.

In one embodiment, the table controller 1000 and/or other devices (e.g., external and operatively coupled other data processing devices, not shown) associated with the gaming table 20 may determine player monetary or chip value balances, including based upon monies associated with play at the table 20 by the player (such as chips purchased), amounts wagered, amounts won, wheel of chance spin outcomes and the like.

The gaming table 20 of the present disclosure may include or be associated with other elements or devices. For example, the gaming table 20 might include other gaming equipment, such as Roulette wheels, one or more player displays (such as located at each player position 30 and configured to display game information, player tracking information, advertising or other information), card shoe(s), card reader(s), card shuffler(s), player tracking devices (such as for reading a player tracking card or other media of a player for use in tracking the player's game play) and the like. The gaming table 20 might also be connected to external devices. For example, the table controller 1000 might be securely coupled (by wire, fiber and/or wirelessly) to one or more casino servers or other data processing systems. These may include a casino accounting server which tracks game play at each of plural gaming tables such as 20, where the tracking may collect information such as that relative to the amounts of wagers placed and winnings paid to the players, among other information. The gaming table 20 might also be connected to a player tracking server and include player tracking elements such as player card readers.

The gaming system might include yet other elements, such as input receiving device controllers or the like. In one embodiment, the input receiving devices 100 communicate with a hub or aggregator 1010 which communicates with the table controller 1000. The hub 1010 may be configured to read or determine the status of each input receiving device 100 and provide information to the table controller 1000, such as for example, when the status of an input receiving device 100 changes. The hub 1010 may also comprise a power source for the input receiving devices 100. As another example, a proximity-type input sensor might be configured as a USB type device having a USB controller. The table controller 1000 may be configured to control the proximity device as a USB device. In this regard, the processor(s) 1002 and/or one or more sub-processors or controllers may be utilized to control the input receiving devices 100 and/or the hub 1010. Although not explicitly shown as such, in one embodiment, the hub 1010 may communicate bidirectionally with one or more of the input receiving devices 100 using a daisy chain type serial link 1007 in which each input receiving device 100 is assigned a unique identification (e.g., address) and information is relayed serially from one device 100 to the next such that the serially relayed information (data signal) reaches its addressed target (e.g., a specifically addressed device 100, two or more multicast-wise addressed devices 100 and/or the hub 1010).

In one embodiment, different kinds of input devices might be utilized for receiving different kinds of inputs (such as one input device for receiving a wager input and another input device for receiving a "spin" initiating or halting input or the like). In another embodiment, the one or more input receiving devices 100 are configured to receive a plurality of different kinds of inputs. In other words, each input receiving device 100 may be configured to receive two or more inputs, for example 3D type hand gestures and wagering tokens of different denominations. The inputs may be game-related inputs by a player and comprise two or more different types of inputs at two or more different times.

In one or more embodiments in accordance with the present disclosure, aspects of the input receiving devices 100 and/or other devices or elements may be controlled or utilized to facilitate the receipt of the different player inputs. For example, the input receiving devices 100 and/or the table controller 1000 may be configured to control the receipt of inputs, such as by selectively activating and deactivating the input receiving devices 100 so that they will message to the players accordingly (via their lights 101-103) and they will receive respective inputs at certain respective times, but not others (e.g., no more wagering placements accepted after the gaming action of a given round has begun). In other embodiments, the respective configurations of the respective input receiving devices 100 may change to facilitate detection and filtering of correspondingly expected input(s), such as by changing a detecting sensitivity to thereby distinguish between an intended player input and an unintended input. In yet other embodiments described herein, one or more secondary elements, such as audio and/or visual indicators may be used in conjunction with the input receiving devices 100 to facilitate the input receiving and/or input inhibiting functionalities of the input receiving devices 100.

In one example embodiment, a wagering game may be presented at the gaming table 20 where the game may has a base or core game portion and an optional secondary or bonus game portion. For example, the base game portion may comprise a card game which is played with one or more decks of physical playing cards. The bonus game might comprise use of a chance bonus wheel spin 36a (e.g., as initiated by a tapping gesture by a player finger over the Px detector 105) for determining a potential bonus award (e.g., enhancing prize 36p1).

In one embodiment, the input receiving devices 100 may be turned off or may be configured to not report inputs except during designated times. This prevents, for example, inadvertent inputs from being received when games are not being presented or when other activities are occurring. For example, it may be preferable for the input receiving devices 100 to not report/recognize inputs between games or during certain portions of a game where inputs are not allowed according to game rules. In one embodiment, players learn that their inputs have been accepted only when certain light patterns (e.g., flashing green lines) are displayed by the respective input receiving devices 100.

In one embodiment, the input receiving devices 100 may be turned off by providing an instruction to them to not receive or transmit inputs. In other embodiments, the table controller 1000 could be configured to ignore input signals from the input receiving devices 100 when certain predetermined conditions exist. In one embodiment, players learn that their inputs cannot be accepted when certain light patterns (e.g., solid red alternating inner/outer circles) are displayed by the respective input receiving devices 100.

In one embodiment, the input receiving devices 100 may be "activated", such as by turning them on or by causing the table controller 1000 to be configured to receive inputs from the input receiving devices 100. This step may be implemented by a dealer, such as by input to the one or more dealer input devices. For example, the dealer display 38 might display a "start game/receive wagers" touch-sensitive button which the dealer may select. In response to that input, the table controller 1000 may be configured to then receive inputs from the input receiving devices 100 or may send control instructions to those devices to cause them to be activated and may present instructions to respective players such as, "Enter your base bet now". In one embodiment, the visible light emitters 101-103 of the devices 100 may emit certain lighting patterns (e.g., slow rotating green radial lines) to indicate that they are ready to accept the placement of such wagers.

After activation, one or more first inputs may be provided to the one or more input receiving devices 100. This may comprise, for example, a first type of input such as a wager input, such as via the detection of placement of one or more chips.

In one embodiment, each player who wishes to play the game may be required to place one or more initial wagers (anting-in bets). The player might optionally be permitted to place other wagers at the start of the gaming action and/or at later times as the gaming action progresses. For example, a player might be required to place one or more base wagers to play the game and might be permitted to optionally place a bonus wager. In one embodiment, one or more input receiving devices 100 are associated with each player position 30. Although less desirable because it might lead to player confusion, more than one input receiving device 100 may be provided relative to each player, such as for receiving a base wager and a bonus or side wager. In the latter case, the respective plural input receiving devices 100, 100" (latter not shown) may have different shapes (e.g., one being circular, the other hexagonal) so that players can intuitively distinguish between them.

In one embodiment, a wager input may be provided by a player placing one or more chips 106a, 106b (provided by the dealer from area 34) on or adjacent to a particular input receiving device 100, such as illustrated in FIG. 3A. At that time, the wager input(s) may be detected by those devices 100 and may be transmitted to the table controller 1000 for processing and storage. Wager information may be displayed to the dealer, such as via the dealer display 38. The dealer might then collect the wager-defining chips and place those wagered chips back in the chip tray 34. In one embodiment, the visible lights of an input receiving device 100 from which a wager has been collected may glow with a color coded indication that the wager has been accepted and locked-in (even though the token had been removed) where the color indicates the amount of the wager (e.g., green for $5, blue for $50). The glow may be one in which the intensity slowly increases and then decreases to intuitively indicate the wager is waiting for a gaming action outcome.

In one embodiment, after a first input period, the input receiving devices 100 may again be de-activated. Once again, this may comprise a dealer providing input to the dealer input device(s), such as the dealer touchscreen 38. For example, the dealer touchscreen 38 might display a "close wager" button which the dealer may select. This may cause the table controller 1000 to no longer receive inputs from the input receiving devices 100 and/or to send a control instruction to those devices to de-activate them. In one embodiment, the visible lights of an input receiving device 100 into which a wager may no longer be placed display a steady red pattern.

At one or more times, the input receiving devices 100 may be configured to receive one or more additional or second inputs. Such a secondary input might comprise a secondary or other additional wager. In one embodiment, different color coded and/or time-changing light patterns are used at the devices 100 for indicating acceptability of the secondary input. One or more of the secondary inputs may comprise a different type of input than the first input. In order to receive the at least one secondary input, the input receiving devices 100 may again be re-activated and optionally reconfigured for a different kind of input. In one embodiment, only certain input receiving devices 100 may be activated for receiving particular inputs. For example, a player who placed a bonus wager and received a certain bonus-triggering result from the play of a base game might be permitted to participate in a bonus event, such as one or more bonus wheel spins. As described below, in one embodiment, a player might be entitled to a corresponding one or more spins of respective award wheels (e.g., 36a) whose outcomes select or determine one or more awards, such as awards for having won a bet. The here disclosed spin technology may be implemented relative to a variety of games, including for example blackjack, baccarat, poker and other such card-utilizing or other symbols-collecting games. In one embodiment, only the input receiving devices 1002 corresponding to only those player positions 30 entitled to participate in the bonus event, award event or the like are activated. In one embodiment, the input receiving devices 100 relative to the other players remain inactive (and optionally show a red stop pattern), such as to prevent accidental input thereto.

In one embodiment, an input signal might comprise a player placing their hand, one or more fingers or another body part or the like on or adjacent to the input receiving device 100, or waving their hand across the device (for example in a predetermined gesture), such as schematically illustrated in FIG. 3B may be used to indicate player desires to the table controller 1000. For example, in response to the detection by proximity detector 105 of a player's hand making a vertical tapping motion, the corresponding input receiving device 100 may send a signal to the table controller 1000 to initiate a spin of a virtual wheel of chance (e.g., 36a). The table controller 1000 may then be configured to cause the table display 36 to display the image of a first wheel (e.g., virtual WHEEL #1) which rotates and then settles into a stopped position that indicates a specific award or bonus location (pie slice) as the wheel determined outcome, such as indicated by the hashed wheel slice in FIG. 1A for the illustrated WHEEL #1. The bonus spin outcome or award selection event may result in the player being awarded a bonus win or a selected or selectable award. In one embodiment, the bonus wheel spin outcome (settled on slice) may entitle the player to a choice among plural hidden prizes 36c (e.g., treasure chests A, B, C). The player may then directionally gesture a slide to the left or to the right over proximity detector 105 to thereby move cursor object 36b to the desired choice. The player may then directionally gesture a slide toward the back of the table (in the −X direction) to finalize the choice. As will be seen, in one embodiment, the proximity detector (Px) 105 can be enabled to detect directional gestures in one or more of 3D axes including horizontal left-to-right (and vice versa), horizontal up-to-down (and vice versa), and vertical (Z axis) top to bottom (and vice versa). The detectable 3D gestures may also include circular movement patterns.

Figure 1B:
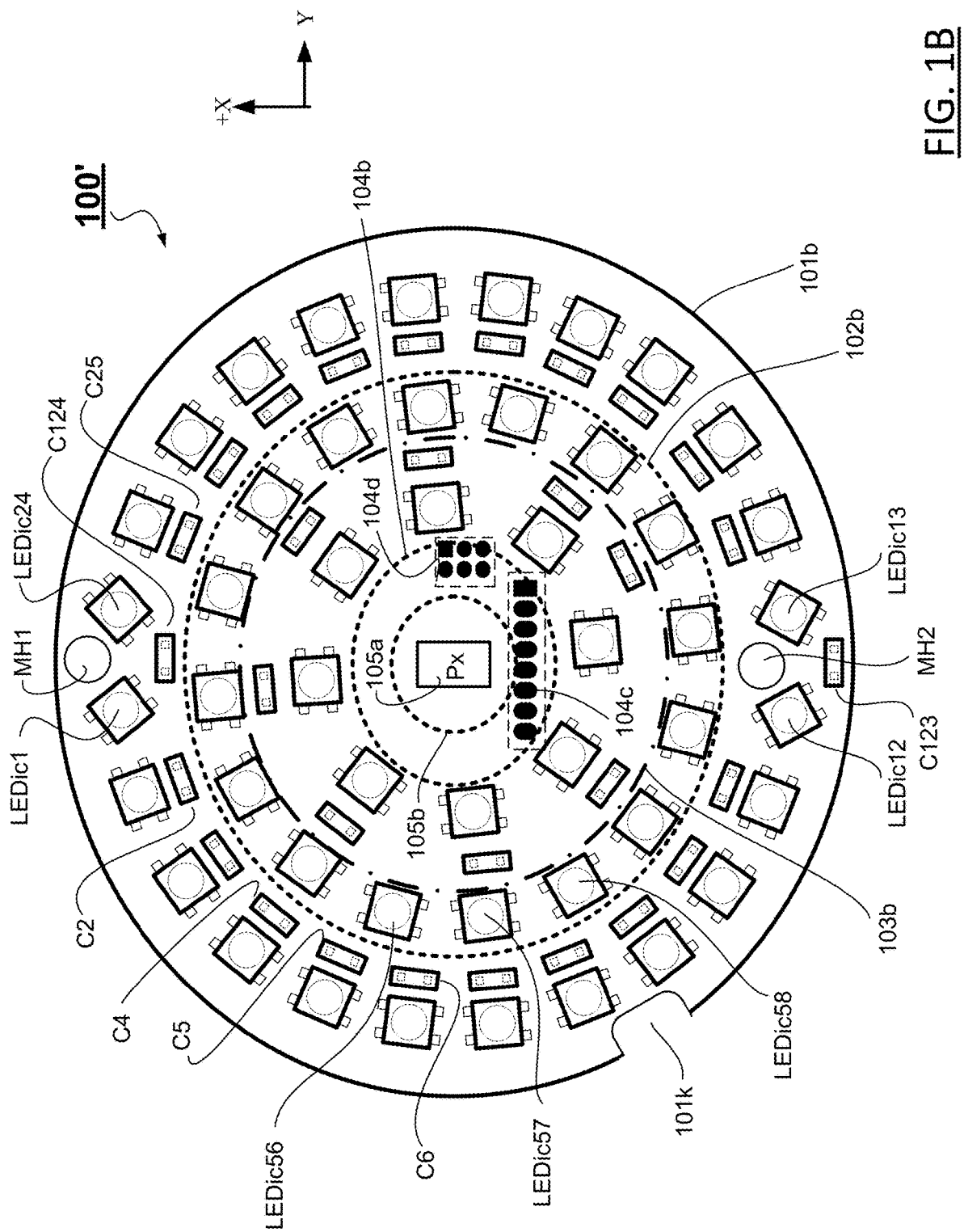
FIG. 1B illustrates a top plan view layout of a printed circuit board PCB of one embodiment having forty-eight serially connected RGB light emitting pixels and a centrally disposed proximity detecting integrated circuit as well as connectors to external resources.

Referring to FIG. 1B, shown is a circuit components layout as seen from a top plan view for one embodiment 100' of the primary input receiving devices. This embodiment 100' includes circular printed circuit board (PCB) having an outer boundary denoted as 101b and an assembly keying notch denoted as 101k. The PCB can be a multilayer laminated circuit board which includes at least one ground plane (Vss) and one higher voltage (Vdd) distribution plane. In one embodiment, circuit components are mounted on both of opposed major faces of the PCB (see also briefly FIG. 1C), there are at least four spaced apart wiring layers including two ground planes (not shown) respectively provided in close proximity with the opposed major faces of the PCB and the higher voltage (Vdd) distribution plane that provides a +5V potential although some of the circuit components operate at a lower potential (e.g., +3.3V). In one embodiment the diameter of outer boundary 101b is 2.12 inches. Certain design deviations were used, as will be explained below, to squeeze the desired number of colored light emitting sources (e.g., LEDic1, LEDic24, etc.) into the limited surface area of the substantially circular PCB. It is contemplated that similar deviations from conventional design strategies may be used to squeeze similar circuit components into PCBs of diameters even smaller than 2.12 inches or to produce input receiving devices with a greater number of light-emitting rings while using substantially circular PCBs (e.g., ones with keying notches provided in their generally circular boundary for assisting in aligned mounting) of diameters slightly larger than 2.12 inches (e.g., about 3 inches or less).

Referring to further specifics of FIG. 1B, it is seen that a plurality of mounting holes (e.g., MH1, MH2) are provided near the outer boundary 101b of the PCB and that corresponding ones (e.g., LEDic1 and LEDic24) of multi-color light emitting integrated circuits disposed about the mounting holes (e.g., MH1, MH2) are oriented differently than the majority of other such light-emitting IC's to make room for the mounting holes. Additionally, rather than being perfectly symmetrical, certain linearly aligned groups of the light-emitting IC's are rotated out of symmetry to make room for the mounting holes (e.g., MH1, MH2).

Continuing with the details of FIG. 1B, the circular PCB is subdivided into annular zones. A first annular zone appears roughly between outer boundary 101b and dashed phantom circle 102b. This first annular zone (101b-102b) is populated by 24 multi-colored light emitting sources (e.g., LEDic1, LEDic12, LEDic13, LEDic24, etc.) and corresponding ones of power supply filtering capacitors (e.g., C2, C25, C124, C123) disposed adjacent to the respective LEDic's. Generally, for the first annular zone (101b-102b) there is one filter capacitor (e.g., C2) disposed adjacent to a corresponding LEDic for minimizing parasitic inductive and resistive currents and connecting as closely as possible to the Vdd and Vss power terminals of that respective LEDic. However, to make room for the mounting holes (e.g., MH1, MH2) certain ones of the power supply filtering capacitors (e.g., C124 and C123) are disposed so as to be each shared by an adjacent pair of the multi-colored light emitting sources (e.g., LEDic1 and LEDic24; LEDic12 and LEDic13). Generally, for the first annular zone (101b-102b) each filter capacitor (e.g., C2) is disposed radially inwardly of its respectively served LEDic. However, to make room for mounting hole MH2, capacitor C123 is disposed radially outwardly of its respectively served LEDic's 12 and 13.

A second annular zone appears roughly between phantom circle 102b and dash-dot phantom circle 103b. This second annular zone (102b-103b) is populated by a further 16 of the multi-colored light emitting sources (LEDic's). A third annular zone appears roughly between phantom dash-dot circle 103b and dashed phantom circle 104b. This third annular zone (103b-104b) is populated by a further 8 of the multi-colored light emitting sources (LEDic's) thus making for a total of forty-eight such light-emitting integrated circuits organized as three concentric rings. Rather than having corresponding power filtering capacitors serving them, the LEDic's of the middle or second annular zone are disposed to share pairs of such capacitors. More specifically, LEDic56 shares the C5 and C6 capacitors that are disposed radially outward from it. LEDic57 shares the capacitors straddling it on its radially inward side and its radially outward side. The pattern repeats for LEDic58 which has access to the two adjacent capacitors on its radially outward side and so on for the multi-colored light emitting sources (LEDic's) of the second annular zone (102b-103b). The 7 of the 8 LEDic's of the third annular zone (103b-104b) are each respectively serviced by a corresponding filter capacitor disposed adjacent to its radially outward side. The eighth of these multi-colored light emitting sources which is closest to a GND and Vdd power supplying connector 104c does not have an immediately adjacent filter capacitor. However because it is so close to the power (and communications) supplying connector 104c, parasitic inductive and resistive currents are relatively minimal for that eighth inner circle LEDic. While the illustrated embodiment of FIG. 1B sports 48 LEDic's distributed about three (3) annular zones, it is within the contemplation of the present disclosure to have a larger or smaller number of such multi-colored light emitting sources distributed about two (2) or more annular zones. In one alternate embodiment, 16 LEDic's are distributed about just two annular zones. In another alternate embodiment, 24 LEDic's are distributed about just two annular zones.

A fourth annular zone appears roughly between phantom circles 104b and 105b. As seen, this fourth annular zone (104b-105b) is primarily reserved on the top side of the PCB for connectors including the aforementioned power (and communications) supplying connector 104c. An expansion connector area 104d is provided for future expansion and/or test and debug purposes. Power signals and control signals emanate radially outward from the centrally disposed supplying connector 104c to the various LEDic's disposed about the first through third annular zones. The power signals (e.g., Vdd and Vss) have the longest distance to travel to the most outwardly LEDic's of the first annular zone (101b-102b) which is why most of these latter LEDic's each have a filter capacitor disposed adjacent to it (the exception being those LEDic's such as LEDic1 and LEDic24 which have a mounting hole near them).

Figure 1C:
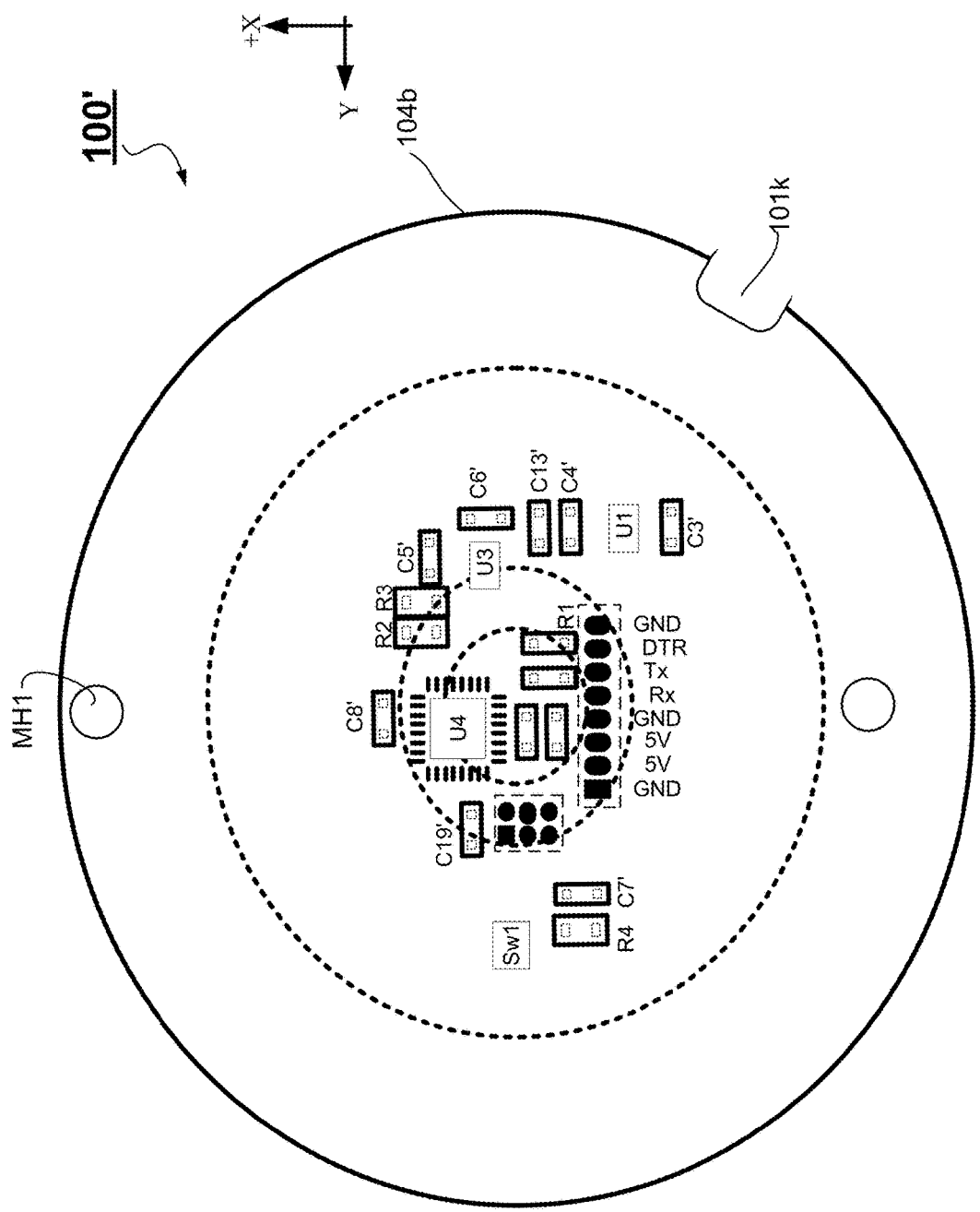
FIG. 1C illustrates a bottom plan view of the PCB of FIG. 1B.

Referring to FIG. 1C, shown is the downward facing major side of the PCB of FIG. 1B. As the seen, the aforementioned power (and communications) supplying connector 104c as three ground (GND) lines extending to it as well as two Vdd (+5V) lines. Additionally, a serial data received line Rx and serial data transmit line Tx are provided. DTR is an active high reset line which is normally pulled low to ground (see also FIG. 5F). A microcontroller unit U4 is mounted substantially centrally on this bottom face of the PCB. Various further filter capacitors, resistors and ancillary other integrated circuits (e.g., +3.3 voltage regulator, +5/+3.3 level shifter) are also provided on the backside. A reset switch Sw1 is optionally provided for debugging purposes.

Figure 1D:
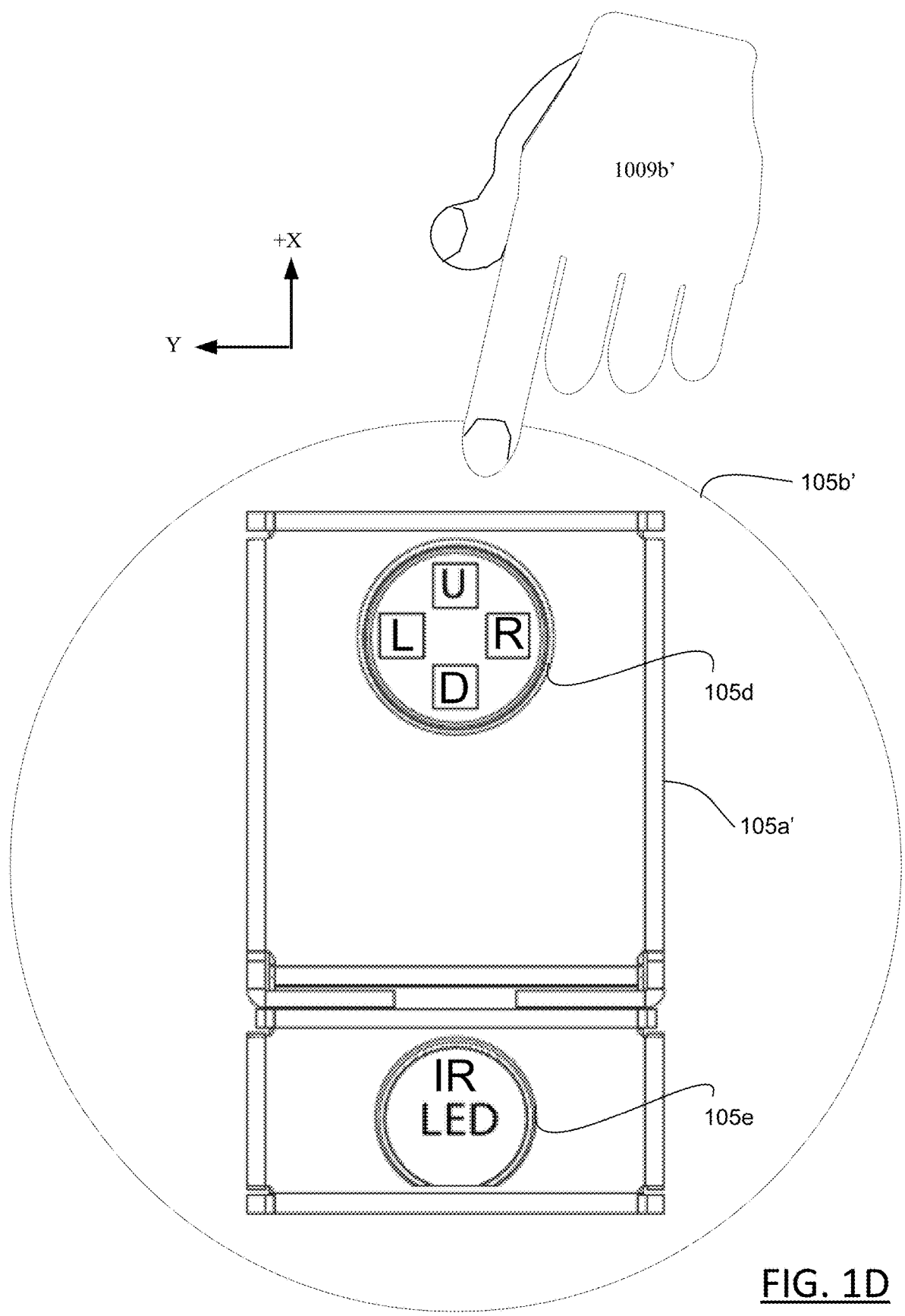
FIG. 1D illustrates a top plan view with more details for the proximity detecting integrated circuit.
Figure 1E:
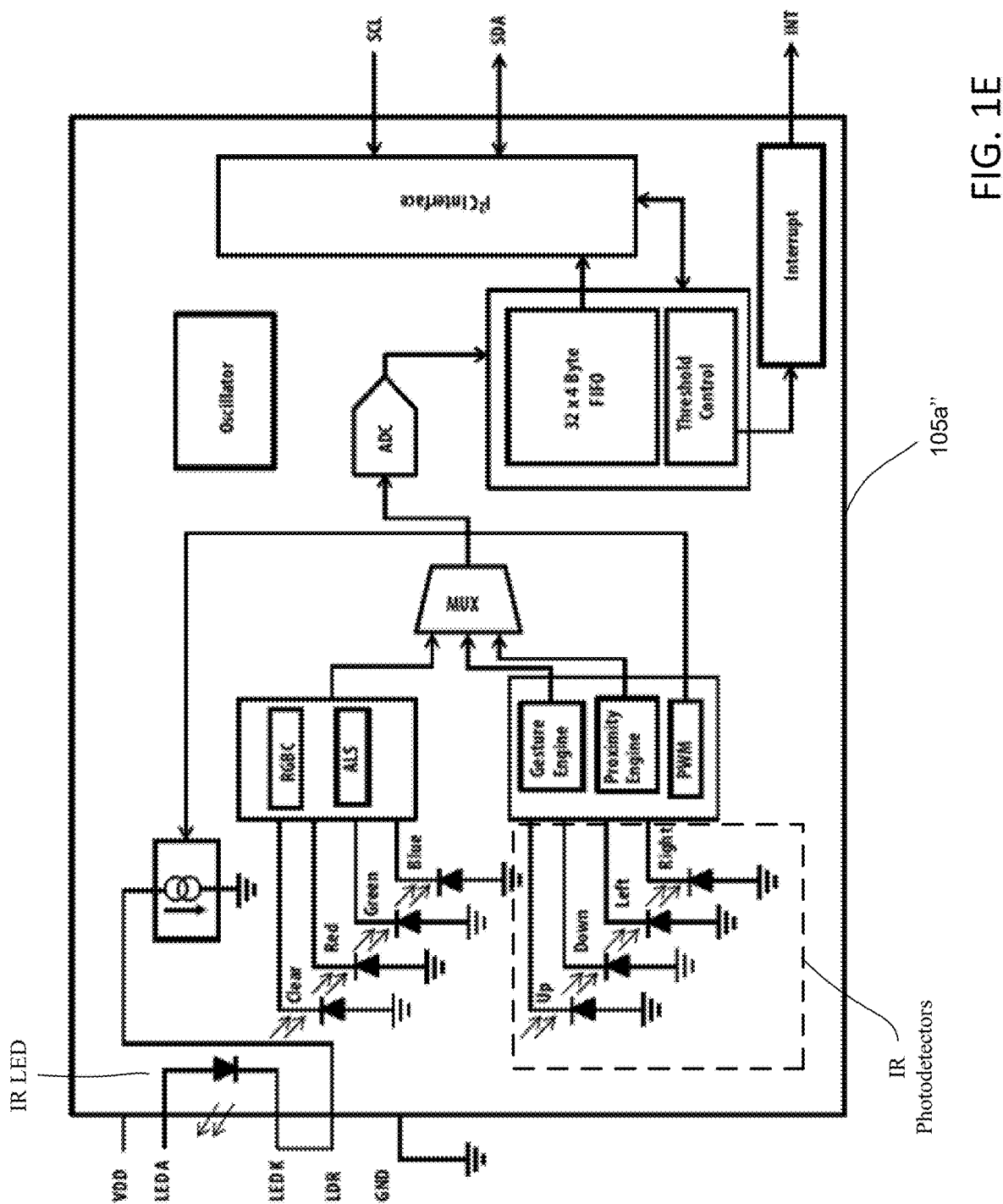
FIG. 1E illustrates a schematic for one embodiment of a proximity detecting integrated circuit.
Figure 4A:
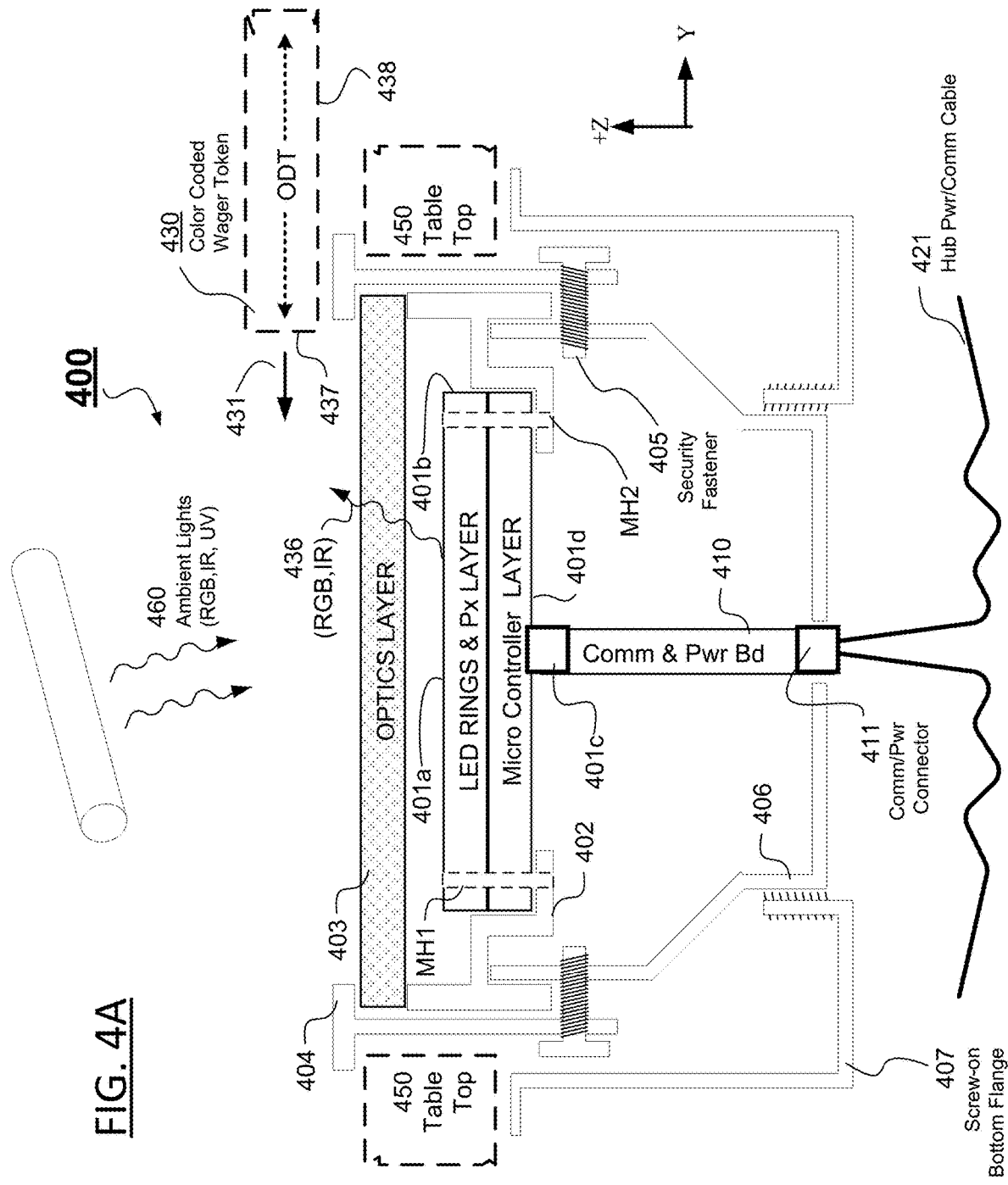
FIG. 4A schematically illustrates a structural assembly for an input receiving device having an associated indicator in accordance with one embodiment.

Inward of phantom boundary circle 105b of FIG. 1B, a proximity detecting integrated circuit 105a is mounted so as to receive both incoming visible light and infrared (IR) signals. Referring to FIG. 1D a more detailed view is shown of what embodiment of the proximity detecting integrated circuit 105a which in this case is an Avago Technologies APDS-9660™ combination IR digital proximity and 3D gesture detector as well as an RGB light sensor available from AvagoTech.com (see briefly also FIG. 1E). FIG. 1D illustrates only an IR (infrared) emitting (105e) and IR directional detecting portion (105d) of the Px integrated circuit 105'. The L, R, U, D blocks refer to directional IR detecting photodiodes of the APDS-9660™ integrated circuit. These blocks allow for movement detection in the left to right (L to R) direction (or vice versa) and in the lateral up (U) to down (D) (or vice versa) of the XY plane. Proximity discrimination in the vertical Z direction is enabled by time-of-flight phase detection for IR pulses emitted from the IR LED 105e. In the illustrated example, a user's hand 1009b' that is implementing a gesture approaches the LRUD detection window 1005d from the player side of the table. Time-of-flight phase detection for IR pulses emitted from the IR LED 105e is performed by one or more of the L, R, U, D directional IR detecting photodiodes so as to determine distance in the Z direction away from the LRUD detection window 105d. The difference in receive signals at the L, R, U, D directional IR detecting photodiodes further determines directional motion of the approaching object (e.g., user's hand 1009b') in the XY plane. Additionally, visible light detectors within the APDS-9660™ integrated circuit (not shown in FIG. 1D) are used to detect colorations in the approaching object as it passes by the detection window 105d and to distinguish between objects (e.g., color coded wager tokens) that are supposed to have predetermined bands of specific colors and objects that do not (e.g., the user's hand). A more detailed schematic of the APDS-9660™ integrated circuit is seen in FIG. 1E. One of the features of the APDS-9660™ integrated circuit is that it has factory pre-calibrated (e.g., trimmed) visible light photodetectors respectively identified as Red, Green, Blue, Clear disposed in the detection window area 105d. These may be used for automatically further calibrating the emissions of the multi-colored light emitting sources (LEDic's)

on the PCB and for accurately detecting the presence or absence of predetermined color codings that are to be provided on the rims (e.g., 107a, 107b) or undersides of wagering tokens (e.g., 106a, 106b) that are placed over the input receiving devices 100 (see also briefly token 430 of FIG. 4A).

In terms of more detail, the APDS-9660™ integrated circuit includes a gestures detection engine that is automatically activated based on proximity engine results. It further includes modules for ambient light subtraction and crosstalk cancellation. Communication is via an interrupt driven I²C bus. The RGB color sensing section includes UV and IR blocking filters so that such portions of the ambient lighting or reflections from the in-IC IR LED emitter 105e do not interfere with accurate sensing in the R, G, B, and Clear bands. Additionally, the integrated circuit features programmability of gain and integration time so as to allow for highly sensitive light detection, even that passed through dark glass.

Figure 1F:
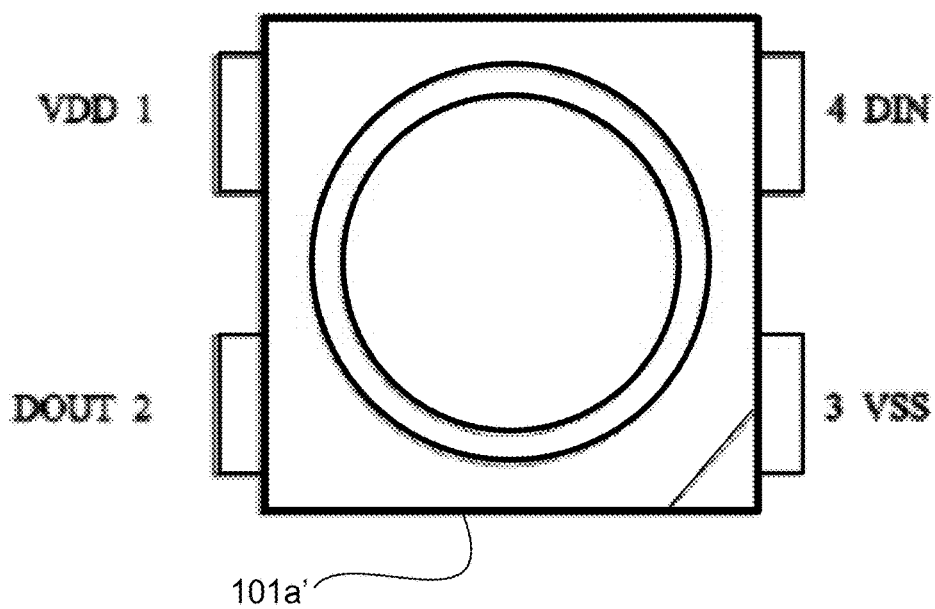
FIG. 1F illustrates a top plan view for one embodiment of a multi-color LED integrated circuit.
Figure 1G:
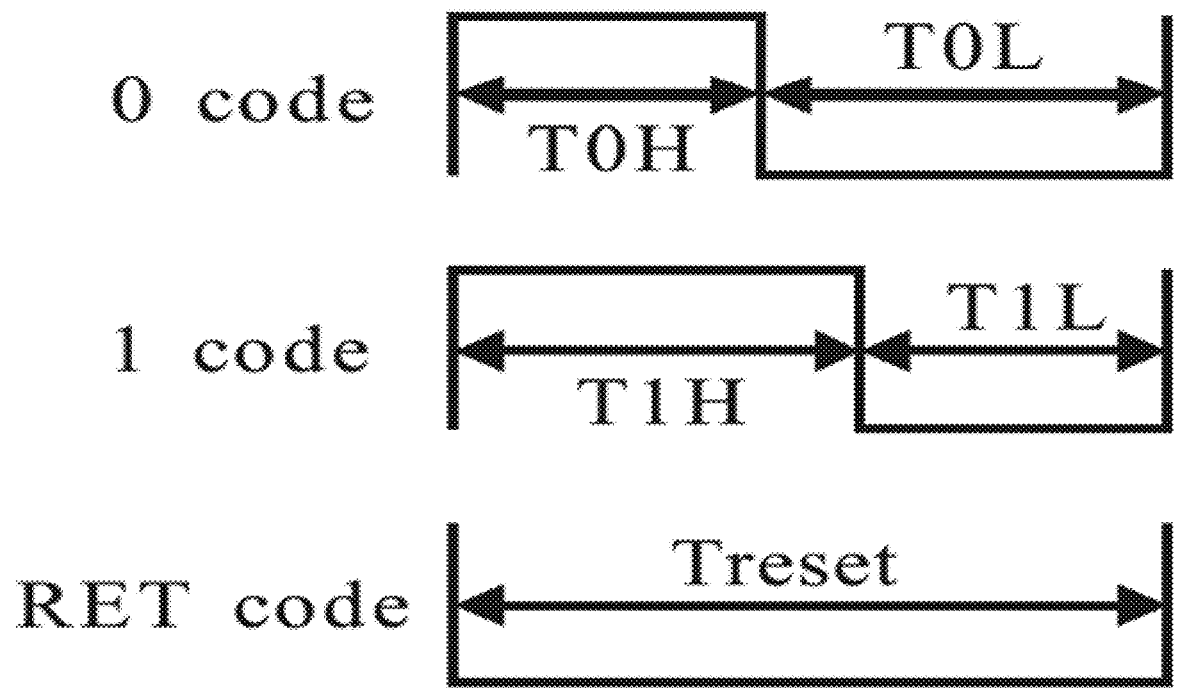
FIG. 1G illustrates a NRZ serial signaling scheme for the LED integrated circuits.

In one embodiment each of the multi-colored light emitting sources (LEDic's) on the PCB is constituted by a four pin package such as that of the Shenzhen Led Color Optoelectronic Co. APA102-Mini-3535™ and/or the Shenzhen Worldsemi Technology Co., Ltd. WS2812B-Mini-3535™ integrated light sources respectively available from said companies. As seen in FIG. 1F, this four pin device uses two of its pins (Vdd and Vss) for power and ground while the other two (Din, Dout) allow for serially cascaded transfer of lighting commands along a daisy chain connected sequence of such integrated circuits. More specifically, each WS2812B-Mini™ integrated light source will consume a 24-bit header portion (after a clock-synchronizing RET code portion—FIG. 1G) of a received input signal (at Din) and forward a repeater-regenerated copy of the remainder of the received input signal (via Dout) as well as the clock-synchronizing RET code portion to the next such integrated circuit in the daisy chain connected sequence. (See briefly FIG. 5A.) Each consumed 24-bit header portion of a respective LED integrated circuit (e.g., LEDic24 in FIG. 1B) represents a lighting command consisting of 8-bits of Red LED information, 8-bits of Green LED information and 8-bits of Blue LED information, thus allowing for 256 levels of intensity specification for the RGB primary colors of the respective pixel implemented by the respective LED integrated circuit including an R=0, G=0, B=0 turn off command. Because of this capability, halftone dithering may be used to create sophisticated images with the arrangement of the forty-eight such LED integrated circuits shown in FIG. 1B or another such arrangements. The daisy chain serial connecting of the forty-eight LED integrated circuits may take the form of a single spiral starting at the inner phantom circle 104b and terminating with one of the LEDic's adjacent to the PCB outer boundary 101b. Alternatively, a plurality of such daisy chained serial connections may be used; for example one for the outer annular zone, a second one for the median annular zone and a third for the inner annular zone. An advantage of having plural such daisy chain serial connections is so that if one of the daisy-chained series suffers a failure at its input and or anywhere further along the chain, the other chains will continue to function and then the point of failure could be more readily isolated. Other configurations of one or more such daisy chained serial connections are also possible. The microcontroller (see U4 of FIG. 1C and also briefly U4 of FIG. 5C) that controls the LEDic's may be programmed to output the appropriate Din signal for each respective daisy chain based on its physical routing among the LED integrated circuits layer.

Figure 4B:
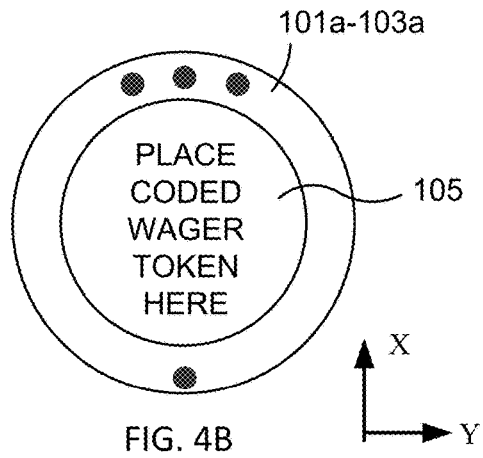
FIGS. 4B-4L illustrate some controller established states for the input receiving device of FIG. 4A.
Figure 4C:
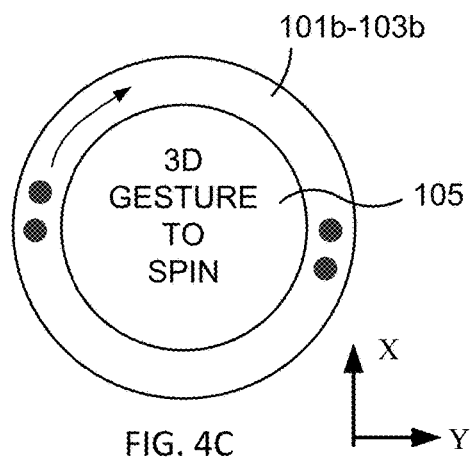
Figure 4D:
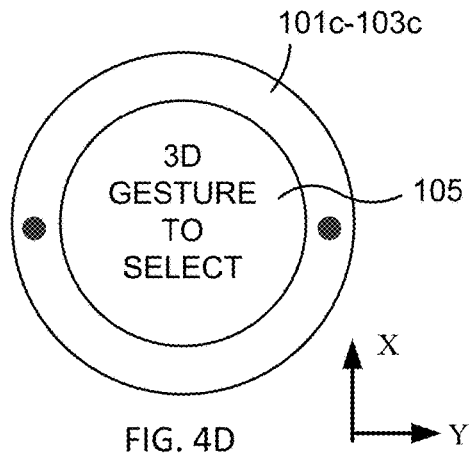
Figure 4E:
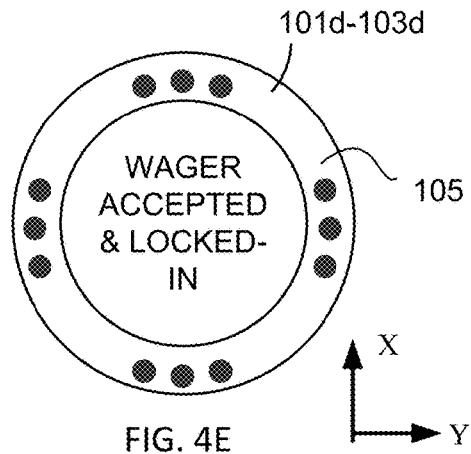
Figure 4F:
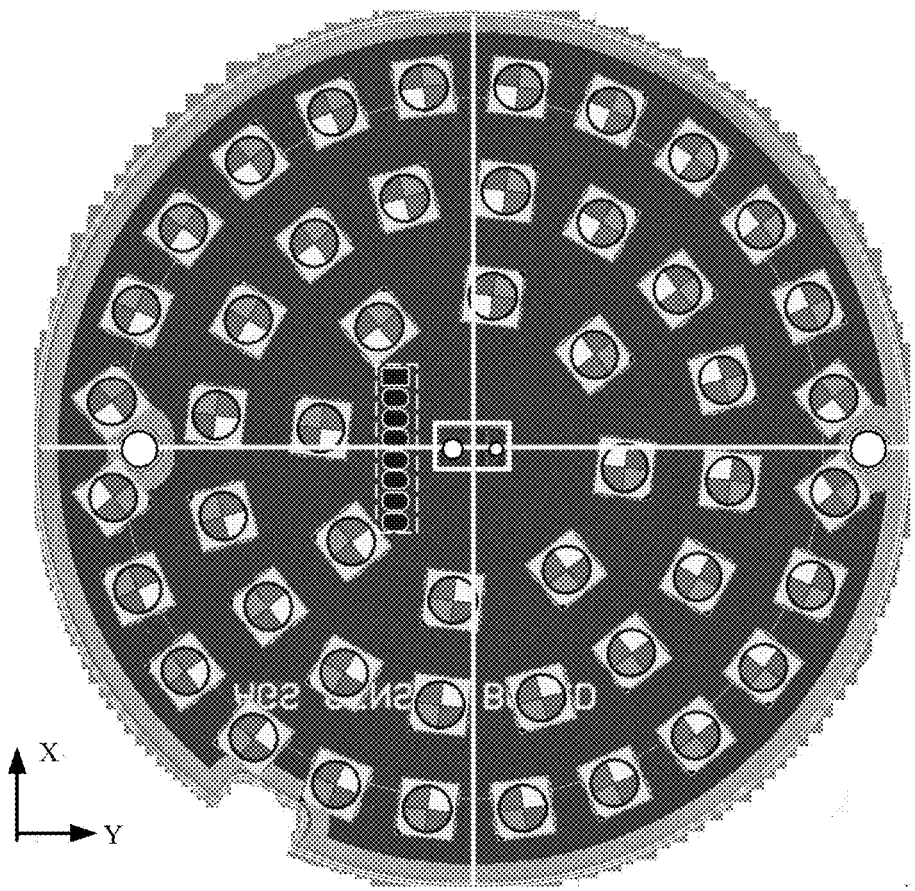

FIG. 4F shows a top plan schematic view of a PCB in accordance with the present disclosure that includes vertical and horizontal phantom guidelines for showing how the design is slightly skewed from a conventional one to make room for the mounting holes and the power/communications connector. The capacitors are not shown for the sake of avoiding illustrative clutter.

Figure 4G:
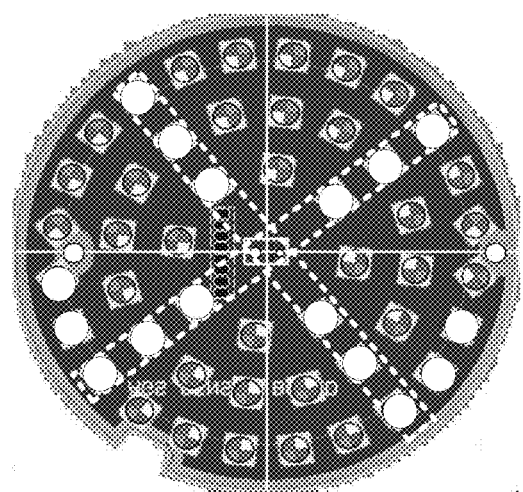
Figure 4H:
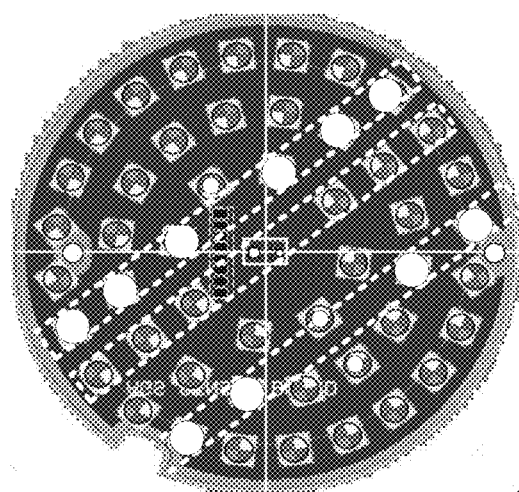
Figure 4I:
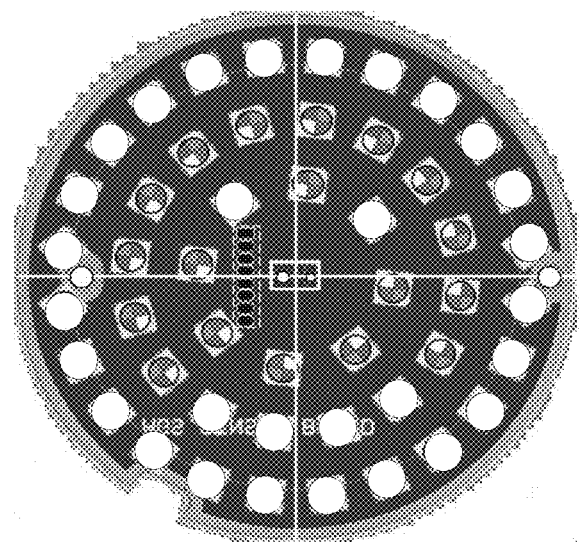
Figure 4J:
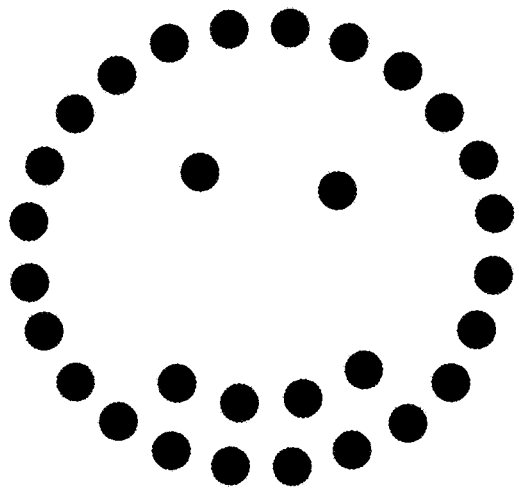
Figure 4K:
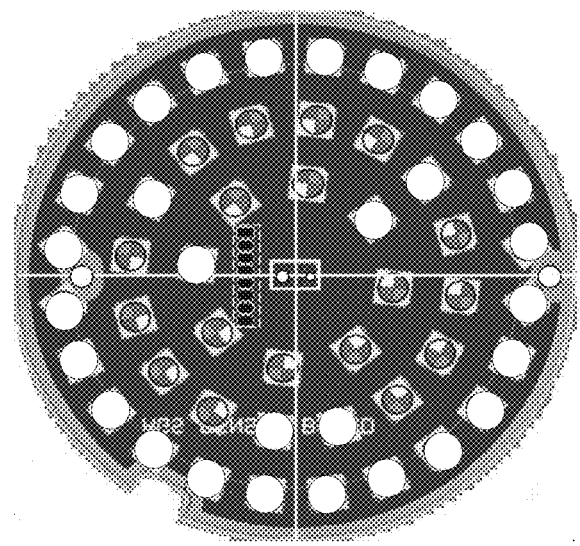
Figure 4L:
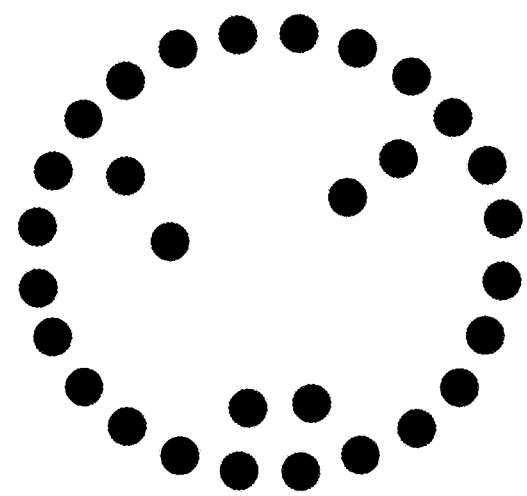

FIG. 4G shows a top plan schematic view of the same PCB with certain ones of the LEDic's lit up to full white (R=255, G=255, B=255) to show how various straight-line or alike patterns may be generated. Although a full "X" pattern of crossed hockey sticks (or check marks) are shown as being composed of only white dots in FIG. 4G, those dots do not all have to be on at the same time or all of them being white at the same time. A multitude of time varying, color varying, as well as intensity varying patterns are contemplated. FIG. 4H shows a top plan schematic view of the same PCB with certain others of the LEDic's lit up to create a perception of off-center slanted lines. Where the lower right line cuts between two LEDic's near the line center, those two LEDic's can be driven with an appropriate pattern dithering intensity to create an impression of a lit pixel located between them. FIGS. 4I-4J illustrate a top plan schematic view of the same PCB with certain others of the LEDic's lit up to create a perception of a happy face emoji. FIGS. 4K-4L illustrate a top plan schematic view of the same PCB with certain others of the LEDic's lit up to create a perception of a sad face emoji. Of course these are crude depictions limited by the nature of the static black and white drawings. The desired perceptions can be enhanced with choice of colors, pixel intensities and animation. Various techniques are known in the art of pixel driving for creating the impression of there being lit spots and/or moving spots in places other than where the physical centers of the hardware pixels are located. Additionally, the LEDic's may be overlaid by an optics layer (see briefly 403 of FIG. 4A) that includes light diffusion and/or focusing functionalities in the visible light band (and/or in narrower bands) and that are at predetermined locations in the X-Y plane of the optics layer for creating desired visual perceptions for users around the gaming table.

Referring to FIG. 4B, shown schematically is a first state where the light emitters in the annular zones 101a-103a are lit in a first pattern (e.g., blinking from having one dot on the bottom to a plurality on the top and then pausing between repeats to indicate an arrow direction), where the light pattern is part of a messaging to the player that a timeslot is now open for placing a color coded wager token 106a or 106b over the center 105 of the sensor 100. FIG. 4C shows a second state where the light emitters in rings 101b-103b are lit as a circulating second pattern and as part of a second messaging to the player that a timeslot is now open for the player to manually initiate the spin of an indicated wheel of chance. FIG. 4D shows a third state where the light emitters in rings 101c-103c are lit as a horizontally alternating pattern to indicate to the player that a timeslot is now open for the player to move a hand either left or right or right to left over the sensor center 105 for moving a cursor (36b) on the screen 36 in a corresponding direction for selecting an available menu option (e.g., 36c of FIG. 1A). FIG. 4E shows a fourth state where the light emitters in rings 101d-103d are lit as a fixed steady pattern to indicate to the player that his or her recently placed wager (now removed by the dealer) has been accepted and locked-in for the upcoming round of gaming action. Different intuitive colors and intensities may be used when lighting up the LEDic's for messaging to the players, for example red to indicate stop, green to indicate permission to proceed and amber to indicate caution. As a result of the ability to intuitively provide different forms a messaging to the players by way of the LEDic's provided in the sensor areas 100, players can learn to be less confused and more confident as fast-paced gaming actions unfold. It is to be understood that the illustrative few examples of patterns mentioned here as ones that can be displayed by the plural rings of multi-colored light emitting sources (e.g., LEDic's) are not limiting. As indicated above, the number of annular zones can be larger or smaller than three (3). The number and/or kinds of multi-colored light emitting sources that are distributed about the annular zones can be different. Animated, colored patterns can be independently instituted in each of the annular zones. For example, a first of the annular zones may be operated to display a gradient of luminances of a first color (e.g., blue) that slowly circulates in the clockwise direction (e.g., one CW rotation every 3 seconds). At the same or a different time, a second of the annular zones may be operated to display a gradient of luminances of a second color (e.g., yellow) that circulates more quickly in the counterclockwise direction (e.g., one CCW rotation every second). The CCW and/or CW rotations may be temporarily paused and then resumed or have their intensities faded out to black and then slowly returned to higher brightness. Animated, colored patterns can also be interdependently instituted among the annular zones. For example, while the other rings remain turned off, the LEDic's of the outermost ring may have their intensity (brightness) slowly increased from dark to bright using a single color (e.g., green) or a predetermined set of colors (e.g., over a ramp up period of about 0.5 second). Then the same ramp up is repeated for the next inward ring and then for the next one after that. The effect may be that of a radially inward flowing pattern. Alternatively, the progression may be from innermost ring to outermost ring to create a radially outward flowing pattern. The patterns may spin or not spin. The patterns may pulsate. In one embodiment, a rainbow of colors spirally chases itself from inwardmost ring to outermost ring or vice versa. In one class of embodiments the patterns are formed to be independent of the angular orientation of each sensor puck 100 relative to the gaming table 22 and/or to a respective player. This can be achieved using the rotating annular patterns mentioned here.

Referring next to FIG. 4A, a side view of one embodiment 400 is illustrated. Surface 401a corresponds to the upward facing side of the PCB as shown in FIG. 1B. Surface 401d corresponds to the down facing side of the PCB as shown in FIG. 1C. Edge 401b corresponds to the outer bound 101b of the PCB as shown in FIG. 1B. Mounting holes MH1 and MH2 are indicated with similar reference symbols. As shown in FIG. 4A, upper surface 401a is part of a layer that includes the central proximity detector (Px) and the plural rings of the visible light emitters (e.g., LEDic's). Bottom surface 401d is part of a layer of the multilayer PCB that includes the microcontroller and the connector pads to which central connector 401c is mounted. The central connector 401c receives an orthogonally oriented daughter board 410 which can have power conditioning circuitry provided thereon (e.g., a +5V voltage regulator) and communications interfacing circuitry further provided thereon. The daughter board 410 has a further connector 411 mounted to an opposed bottom end thereof. A serial interconnect cable 421 may link into and out of the bottom connector 411 for carrying power supplied from the table hub module (1010 of FIG. 2) and for carrying serial communication signals to and from the hub.

The PCB mounting holes, MH1 and MH2 aligned with screw holes provided in a bottom supporting structure 402 which supports the PCB from its bottom side (e.g., with machine screws (not shown) inserted from the bottom and threaded into the PCB) and also supports an optics layer 403 that is disposed as spaced apart by a predetermined separation distance from the PCB upper surface 401a. In one embodiment, the interior of the bottom supporting structure 402 is cylindrical in shape and colored black to prevent side reflections from it to the proximity detector Px. A flanged clamping cylinder 404 (e.g., also colored black) clamps the elements of the optics layer 403 down against an upper portion of the supporting structure 402. The flanged clamping cylinder 404 additionally inserts downwardly into a cylindrical hole passing through the tabletop 450 so that the sensor assembly (e.g., that including 401a, 401d, 401c, 410, 411, 403) may rest on and be substantially flush with the top of the gaming table. Although not shown, the top of the flanged clamping cylinder 404 may have a beveled bezel for allowing easy sliding of wagering tokens (e.g., 430—discuss shortly) from the tabletop and on to a desired central portion of the optics layer 403 over the proximity detector Px.

A security cover 406 that includes a frusto-conically shaped middle section surrounds the communication/power daughter board 410, the bottom connector 411 and fits into a cylindrical receiving depression formed in the bottom supporting structure 402. In one embodiment, the interior of the security cover is colored black to avoid unwanted light reflections. Security screws (or other appropriate fasteners) 405 connect from the outside of the flanged clamping cylinder 404 to the inside of the security cover 406 to secure the two together. In one embodiment the security cover 406 has a first cylindrical portion at its top extending from the frusto-conical portion and fitting into the cylindrical receiving depression of the bottom support structure 402. The security cover 406 further has a second cylindrical portion of smaller diameter at its bottom extending from the frusto-conical portion with threading provided around the outside of this second cylindrical portion. A screw-on bottom flanged piece 407 screws onto the lower threaded cylindrical portion of the security cover and tightens up against the bottom of the tabletop 450 while also covering access to the security fasteners 405. Thus the sensor assembly is securely mounted to and through the table top. To remove the sensor assembly, one has to get under the gaming table and unscrew the screwed-on bottom flanged piece 407. In one embodiment, the serial hub connection made at connector 411 first has to be disconnected before the screw-on bottom flanged piece 407 can be unscrewed from the security cover 406. When the serial hub connection is so removed from connector 411, a disconnect signal is automatically generated by the hub (1010) indicating which sensor 100 on the table has become disconnected. This disconnect signal is sent to a central security server so that no table gaming input sensor can be interfered with without knowledge of and authorization by the central security server. If unauthorized tampering is detected, appropriate alarms are generated.

In one embodiment, the optics layer 403 is a multilayered one having an anti-scratch surface on its top and further optical processing layers beneath it. At least part of the optics layer 403 is configured to allow RGB visible light emitted from the LED rings and IR proximity sensing light emitted from the proximity detector Px to exit through it as indicated at 436 so that the proximity detector Px can perform its proximity detection functions using pulsed IR radiation and so that users of the table can see desired lighting effects emitted from the LED rings of PCB surface 401a. In one embodiment, the optics layer 403 includes a darkened or smoked glass or other such semi-opaque light passing material (e.g., composed of one or more appropriate plastics) having an opacity that hides the details of the circuitry on the PCB upper surface 401a and yet allows for functional operability of the photodetectors inside the proximity detector Px for detecting the reflection of the IR pulses emitted from the detector Px and returned from an approaching object (e.g., wager token 430 or a gesture making player's hand). Additionally, the optics layer 403 allows for detecting of visible light colors reflected from objects (e.g., user's hand or wagering token 430) as they pass by or come to rest over a detection window of the detector Px. In one embodiment, the optics layer 403 has an opacity rating of around PB40 or a lesser opacity. It has been found that the visible and IR light detectors of the APDS-9660™ integrated circuit consistently work well even when a PB40 filter is interposed between that proximity detector and features (e.g., 430) that are to be detected above the filter.

When a casino-issued wagering token 430 is laterally slid along the tabletop and then over the detection window of the proximity detector Px, several things take place. The Px integrated circuit is automatically repeatedly switching among the number of its operational modes including that of scanning for approaching objects with its pulsed IR emissions and scanning for changes in the ambient lighting with its visible light detectors. As the wagering token 430 moves laterally in the indicated direction 431, the proximity detector Px will begin to detect a change from the normal ambient condition (which normal ambient condition, such as consistent flickerings of lights 460 from overhead light sources are stored in a history buffer and automatically subtracted from current inputs so as to better differentiate when there is a change). The proximity detector Px will also detect the intensity of IR reflections from the approaching wagering token 430 and the direction 431 from which it is approaching towards the center of the detection window. Moreover, as the token approaches, reflections of ambient light (460) from the cylindrical outer rim 437 of the token will be newly added to what was the normal ambient inputs that the visible light detectors (RGBC) were previously detecting. This changed optical input is detected by the proximity detector Px. In one embodiment. the cylindrical outer rims 437 of a first class of tokens are color-coded with a first color not usually found on player hands (e.g., green) so as to signify a first wagering value of and/or first kind of token while the outer rims 437 of a second class of tokens are colored with a different second color also not usually found on player's hands (e.g., purple) so as to signify a different second wagering value and/or a second kind of token. The detected rim color is reported to the software executing in the table controller 1000.

As the token 430 continues to move in direction 431 to fully cover the detection window of the proximity detector Px, light 460 from the overhead sources are blocked (assuming the token is opaque, wherein other embodiments it may be translucent). This change condition is also reported to the table software. Next, certain ones of the lights in the LED rings of PCB layer 401a are turned on to a predetermined intensity for illuminating the underside 438 of the overlying token 430. A corresponding color reflected from the underside 438 is detected and reported to the table software. In one embodiment, the coloring on the underside is also an unusual one not normally found on a player's hand (e.g., yellow). One or a combination of the colors detected from the underside 438 and from the rim 437 of the token 430 placed over the sensor area 100 is used for determining at least one of a wager value and a wager type. Dimensions of the specially colored areas on the token and the timings of their detection may be used to determine the speed at which the token 430 was slid onto the sensor area 100. This additional information may also be forwarded to the table software for use as deemed appropriate.

Although FIG. 4A depicts an embodiment with all individually programmable emitters of visible light (e.g., LEDic's) mounted on the top surface 401a of a multilayer printed circuit board (PCB 401a/401d), it is within the contemplation of the present disclosure to alternatively or additionally have individually programmable RGB emitters (e.g., LEDic's) mounted on the bottom surface 401d and/or on a separate additional PCB (not shown) while the light outputs of these emitters are routed towards the top optics layer 403 by way of optical fibers and/or other light guiding devices (e.g., waveguides). It is within the contemplation of the present disclosure to provide for heat dissipation in cases where relatively high levels of luminance are desired from each independently programmable RGB emitter (pixel) and a relatively large number of such emitters (e.g., greater than 48) are crowded into the secured interior of the sensor assembly. For example, bottom support structure 402 may be made of or may include a good heat conducting material (e.g., copper, aluminum, etc.) that is thermally coupled to the RGB emitters (e.g., LEDic's) and is further thermally coupled by way of security fasteners 405 two a finned heat sink (not shown) extending downwardly within the screw-on bottom flange 407, where the latter has ventilation holes (not shown) for in-taking cool air from the bottom of the assembly and exhausting warm air from upper side portions of the assembly that are underneath the tabletop 450.

It is within the contemplation of the present disclosure that integrated circuit packages with plural independently programmable RGB emitters of relatively high efficiency will become available and that such multi-color emitters-containing IC's may be substituted for the single-pixel per package LEDic's of FIG. 1B so as to thereby provide denser concentrations of independently programmable, multi-color pixels organized into respective rings (annular zones). Examples of such multi-pixel IC's may include ones with a 2×2 square array of independently programmable pixels (4 pixels per IC) or with a 3×3 square array of independently programmable pixels (9 pixels per IC) and so on. Various color-based and intensity-based animation effects similar to ones disclosed herein for the single pixel RGB IC's (LEDic's) may be implemented with such multi-pixel IC's.

In one embodiment, the following automated steps take place: (1) Determine that an object is within a predetermined proximity of the Puck Sensor; (2) Sample the RGB colors of the incoming object to distinguish between token or presence of a human hand; (3a) If token, determine the token denomination (e.g., Green=$25; Yellow=$5); (3b) If not token and/or predetermined hand characteristics detected, switch into gesture determining mode and interpret the hand gestures. In one embodiment, the proximity measuring and gesture interpretation features of the Px IC are factory-trimmed and calibrated to a resolution of 100 mm proximity detection distance without requiring customer calibrations. Gesture detection utilizes the four directional photodiodes, integrated with visible blocking filter, to accurately sense simple UP-DOWN-RIGHT-LEFT gestures or more complex 3D gestures. When a side-bet "chip" is detected by the Puck Sensor, serial data may be automatically transmitted to the Table Controller (1000) as an indication to the Table Controller system and to the dealer/operator that a specific player has placed a side-bet "chip" at his/her specific game table seat position. Besides detecting a side-bet "chip", the Puck Sensor may also detect player hand motion/gestures and game specific markers during game play. In one embodiment, the Puck Sensor uses smart RGB LEDs such as the WS2812B Mini 3535 RGB LED and/or the SK6812 3535 RGB LEDs arranged as three concentric circles. The arrangement of the LEDic's as plural concentric annular structures allows the software to display unique color patterns and/or animations, such as simulating a spinning color wheel or a flashing red stop sign. The smart RGB LEDs may be efficiently controlled using a single micro-controller, for example, an ATmega48A/PA/88A/PA/168A/PA/328/P low power, CMOS 8-bit microcontroller available from Microchip Technology Inc. at www.microchip.com.

In one embodiment, the following code may be stored in the microcontroller for controlling the lights and providing various lighting effects:

```
ringlet[i].reset(3);
    //ringlet[i].state=0;
    ringlet[i].setColor(000, 000, 255);
    ringlet[i].setFade(i,   RINGS_LCM*21/FADE_RANGE/
2);
    //ringlet[i].setColors(colors);
    //ringlet[i].setRainbowWave(1);
    }
  }
}
apds.getColorData(&r, &g, &b, &c);
}
else if (!pause)
{
for (int i=0; i<NUM_RINGS; i++)
ringlet[i].update(thistime);
FastLED.show( )
}
while (Serial.available( )
{
Serial.readBytes(&inbuf, 1);
if (inbuf==0x41)
    {
      outbuf[0]=0x65;
    outbuf[1]=0x05;
      outbuf[2]=0x41;
    outbuf[3]=0x00;
      outbuf[4]=ischip ? 0x01: 0x00;
    outbuf[5]=0x00;
    outbuf[6]=0x00;
    outbuf[7]=0x49;
    Serial.write(outbuf, 8);
    break;
    }
else if (inbuf==0x42)
    {
    outbuf[0]=0x65;
      outbuf[1]=0x05;
    outbuf[2]=0x42;
    outbuf[3]=0x00;
    outbuf[4]=0x01; //1 puck
      outbuf[5]=0x00;
    outbuf[6]=0x00;
    outbuf[7]=0x49;
    Serial.write(outbuf, 8);
    break;
    }
//else switch (inbuf)
//{
//case 'p':
//if (pause)
//for (int i=0; i<NUM_RINGS; i++)
//ringlet[i].reset(3);
//pause=!pause;
//sprintf(outbuf, "% d PAUSE=% d\n", inbuf, pause);
//Serial.print(outbuf);
//break;
//case '+':
//FastLED.setBrightness(++brightness);
//Serial.print(brightness);
//break;
//case '-':
//FastLED.setBrightness(--brightness);
//Serial.print(brightness);
//break;
//default:
//sprintf(outbuf, "% d R % d G % d B % d C % d P % d\n",
    inbuf, r, g, b, c, prox);
//Serial.print(outbuf);
//break;
//}
   }
}
```

Figure 5A:
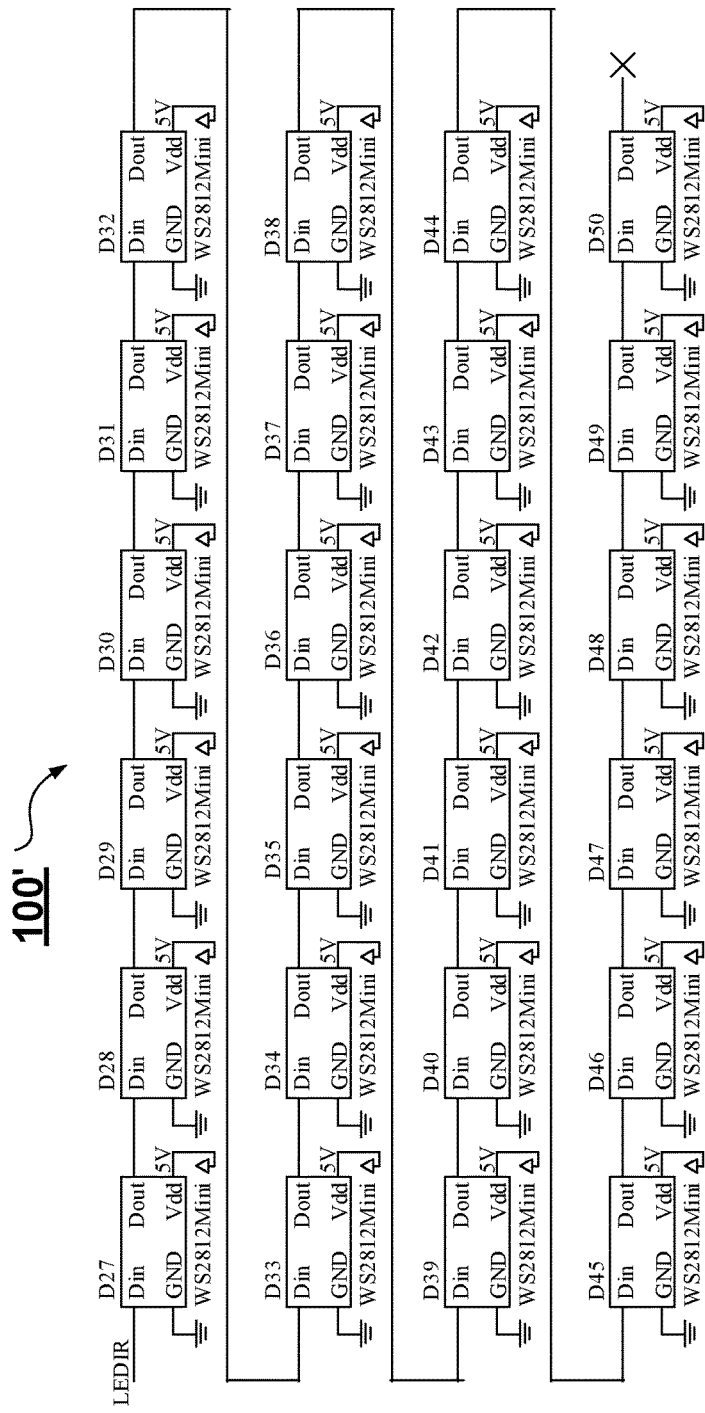
FIGS. 5A-5F provide an example schematic for the input receiving device of FIG. 1B.

Referring to FIG. 5A, shown is a schematic of two serially linked daisy chains of LEDic's each having twenty-four such smart LED integrated circuits. The outer annular ring is driven by a signal from one of the microcontroller serial output ports denoted as LEDOR (for Outer Ring). The middle and inner annular rings are driven by a second signal from another of the microcontroller serial ports denoted as LEDIR (for inner rings). As seen in FIG. 5A, the data output (DOUT) pin of a first LEDic in each chain connected directly to the data input (DIN) pin of the next successive LEDic in the chain until the terminal end of that chain is hit. The DOUT pin at the end of each chain is left unconnected.

Figure 5B:
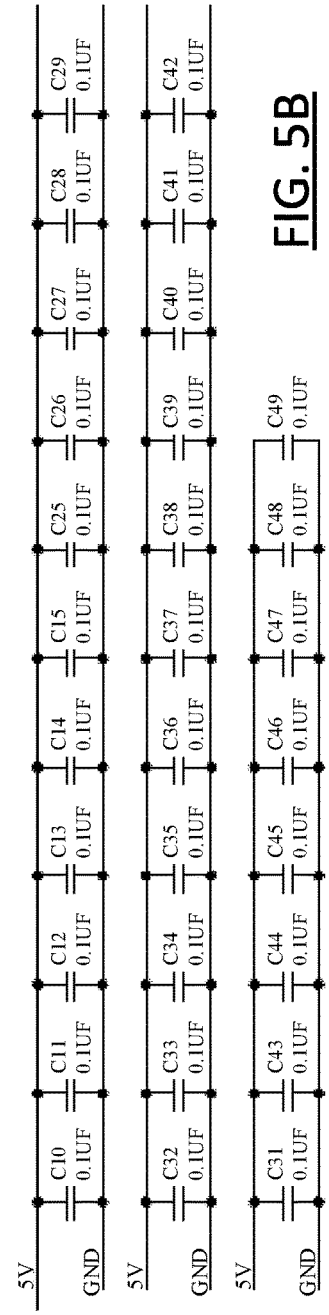

FIG. 5B is a schematic of some of the power filter capacitors used in the design of FIGS. 5A-5F. In one embodiment each such filter capacitor is 0.1 µF.

Figure 5C:
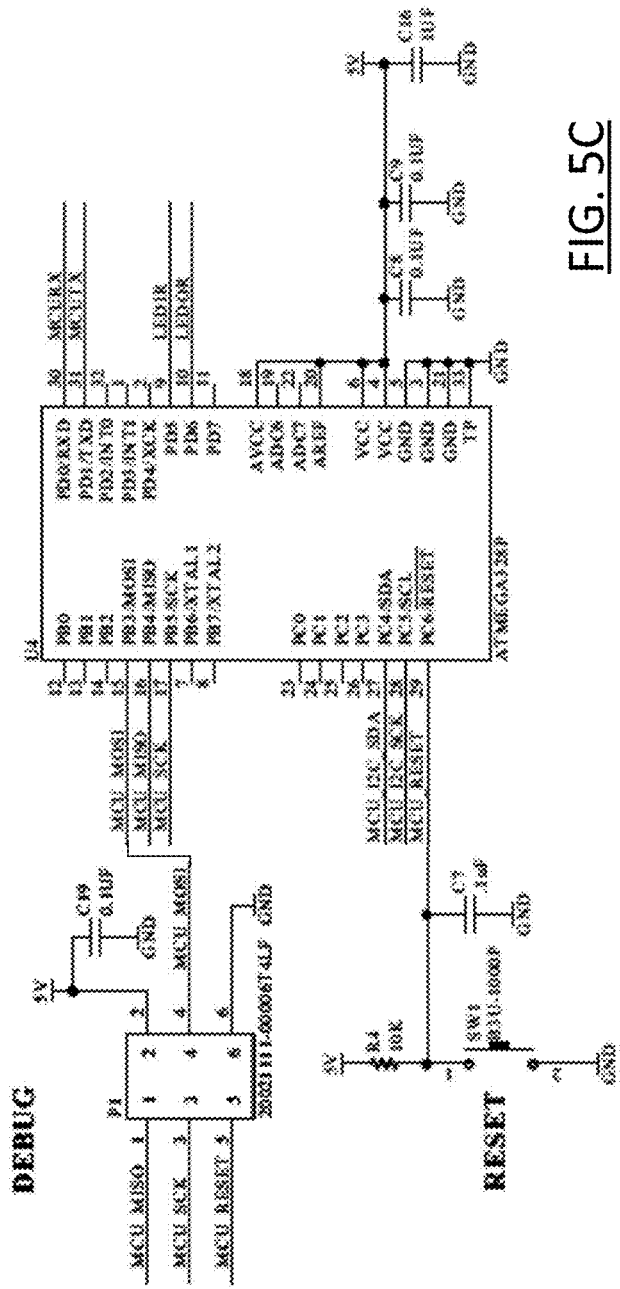

FIG. 5C is a schematic diagram showing connections for the microcontroller (U4) as well as a planned pinout for a debug socket (P1) and the connection of the reset pushbutton switch Sw1.

Figure 5D:
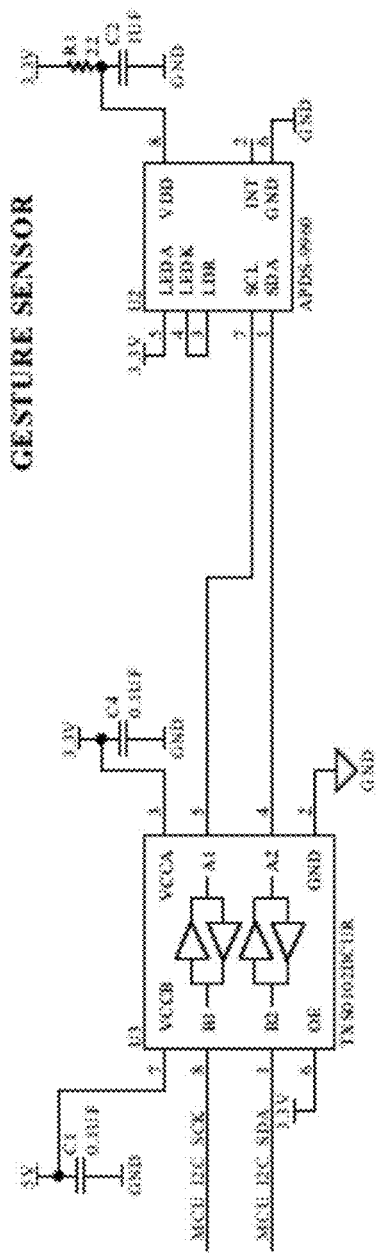
Figure 5E:
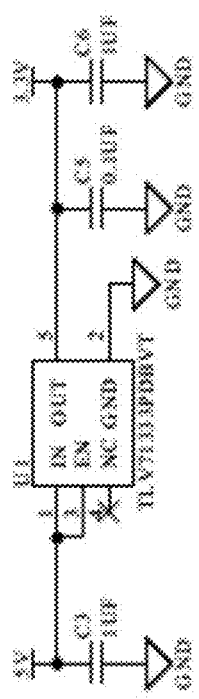
Figure 5F:
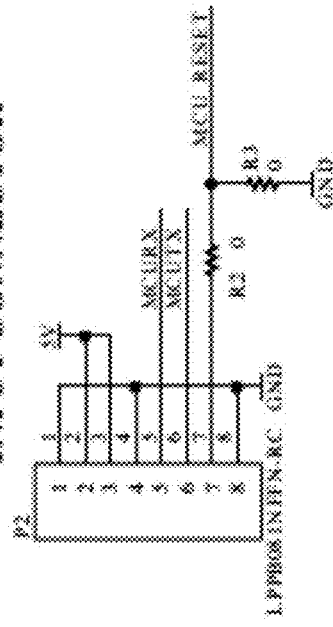

FIG. 5D is a schematic diagram showing the interfacing between the 5V signals of the microcontroller and the 3.3V signals of the proximity detector IC (U2). Briefly, a bidirectional level shifter U4 such as a TXSO102DCUR is used. FIG. 5E is a schematic diagram showing the voltage regulator (U1) used for producing the 3.3V power level from the main +5V supply of the PCB. FIG. 5F is a schematic diagram showing the power and communications connector 104c already discussed with respect to FIGS. 1B-1C.

Figure 6:
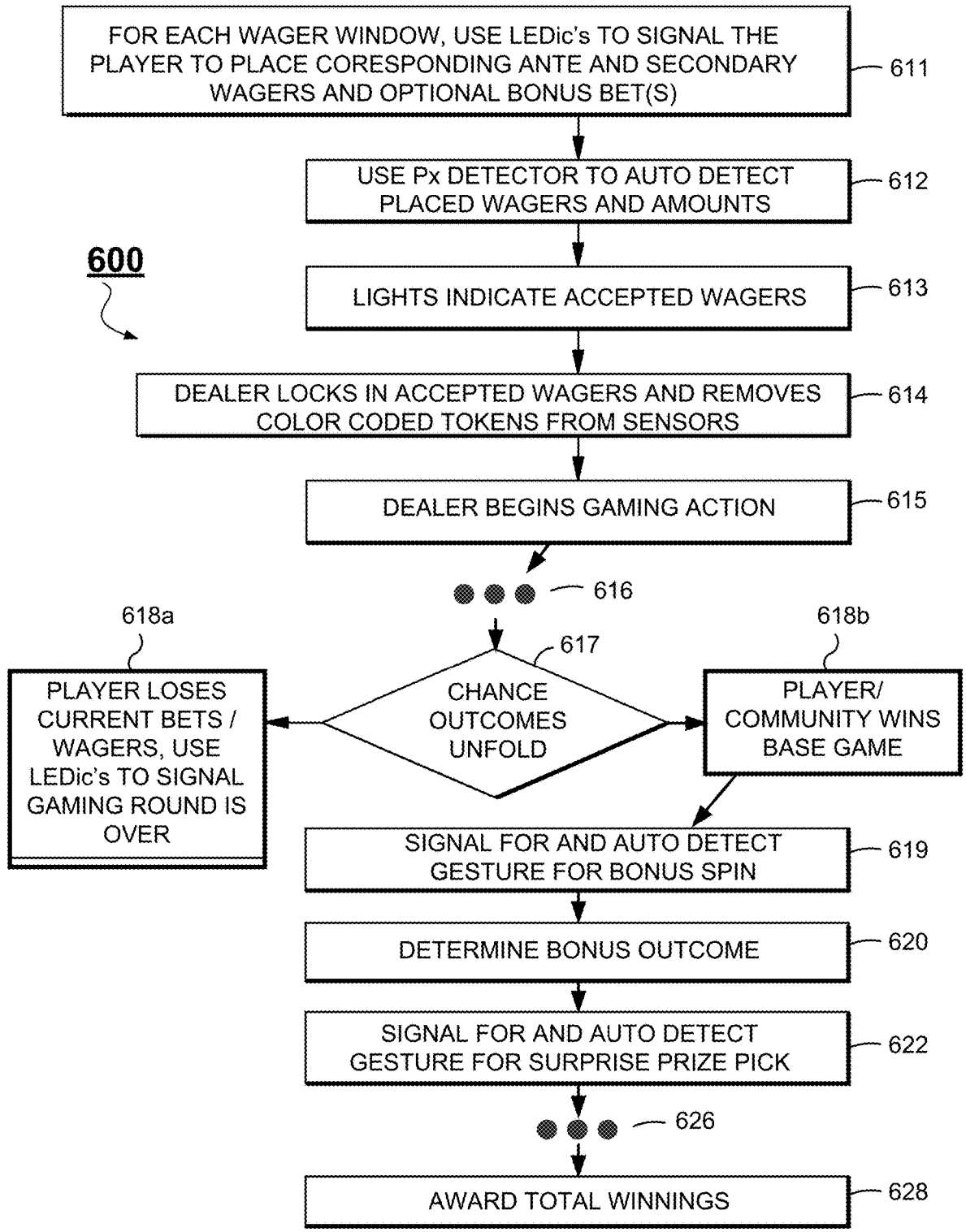
FIG. 6 is a process flow diagram which illustrates embodiments of presenting and playing games in accordance with the present disclosure of invention.

Referring to FIG. 6, shown is a process 600 where the sensors 100 are used for messaging to the players at respective betting positions and receiving appropriate wagers or other inputs from the respective players of those betting positions. In step 611 the LEDic's are driven to message to each respective player that a corresponding time window is now open for receiving a required ante wager or for receiving an optional bonus and side bet wagers. More specifically, in one embodiment, flashing green and blue light patterns are used to signal to the respective players when required or optional ante and other types of bets need to be placed. Solid red light patterns are used to signal that wagers are currently not being accepted. A solid green circle of lights of diameter corresponding to the OD of the place wager token is shown when the placed wager is accepted. The innermost circle of lights is blue or yellow depending on the accepted amount.

As shown in step 612, when a wager-representing token is timely placed over the sensor 100, the proximity detector IC (Px) of that sensor is used to detect the placement of such a token and its represented value. At step 613, the light patterns output by the sensor 100 are changed to indicate that the placed wager has been accepted and optionally to indicate the amount of the accepted wager (e.g., Blue=$5, Yellow=$50). At step 614, the dealer closes the time window for further wagers in a corresponding wagering round and signals the table controller (1000) to lock in the currently accepted wagers. The dealer then removes all the accepted wager tokens from the table. At the same time, the table controller (1000) commands all the tables sensors 100 at which respective wagers have been locked-in to show light patterns indicating that those wagers are locked-in.

At step 615, the dealer begins the wagered upon gaming action. This may proceed through a variety of activities 616 including for example, the dealing out of cards from a deck, the rolling of dice, the spinning of a Roulette wheel, the spinning of other wheels or equivalent mechanisms of chance and so on. At step 617, the final outcomes of the base gaming action (e.g., card game) are revealed. The revealed results may indicate that the player of a respective betting location has lost all his current bets and wagers. This condition may be detected automatically by the table software or signaled by the table dealer. Corresponding to such a loss (step 618*a*), the LEDic's of the betting position are used to signal to the player that the gaming round is over and he or she has lost. In one embodiment this may entail displaying an icon that looks like a sad face emoji (e.g., FIG. 4L).

On the other hand, for those betting positions where a player has one individually or is entitled to a community prize based on a community event in the base game, this condition may also be detected automatically by the table software or signaled by the table dealer. In response and at corresponding step 618*b*, the LEDic's of the respective betting positions are used to signal to those players that the gaming round is over and he or she has won something. In one embodiment this may entail displaying an icon that looks like a happy face emoji (e.g., FIG. 4J).

An example of what may next happen when a winning player wins a chance for a bonus spin is shown at step 619. The LEDic's of the respective betting position are used to signal to the player that a wheel spin is coming up. Then the Px detector of that betting position is used to detect a hand gesture made by the winning player for initiating the bonus spin. At step 620 the outcome of the bonus spin is determined. In one embodiment, the bonus spin may entitle the player to pick a surprise prize 36*c* (e.g., one of treasure chests A, B, C of FIG. 1A). At step 622, the LEDic's of the respective betting position are used to signal to the player that a hand gesture is needed for moving an on-screen cursor (e.g., 36*b*) to the left or to the right. This may be signaled for example by light dots that move in one direction across the circle area of the sensor 100 and then pause and repeat. The Px detector of that betting position is then used to detect a hand gesture made by the player for moving the cursor. In one embodiment, the colors and animations of lights output by the sensor 100 match similar colors and animations appearing on the tables big-screen 36. This allows the player to intuitively understand the connection between what is being displayed at the sensor 100 and what is being correspondingly displayed on the screen and 36. Various other activities involving the sensor 100 and gestures made by respective players at different betting positions for activating or stopping the spinning of wheels or the movement of other by chance mechanisms (e.g., spinning virtual reels) may be provided in continuation portion 626. At step 628 the total winnings of each participating player are respectively awarded. The LEDic's of all the tables sensors may then be turned off for short while to indicate that the round is over and then they are turned on again to indicate the beginning of a next gaming round requiring placement of a new ante wager.

Figure 7:
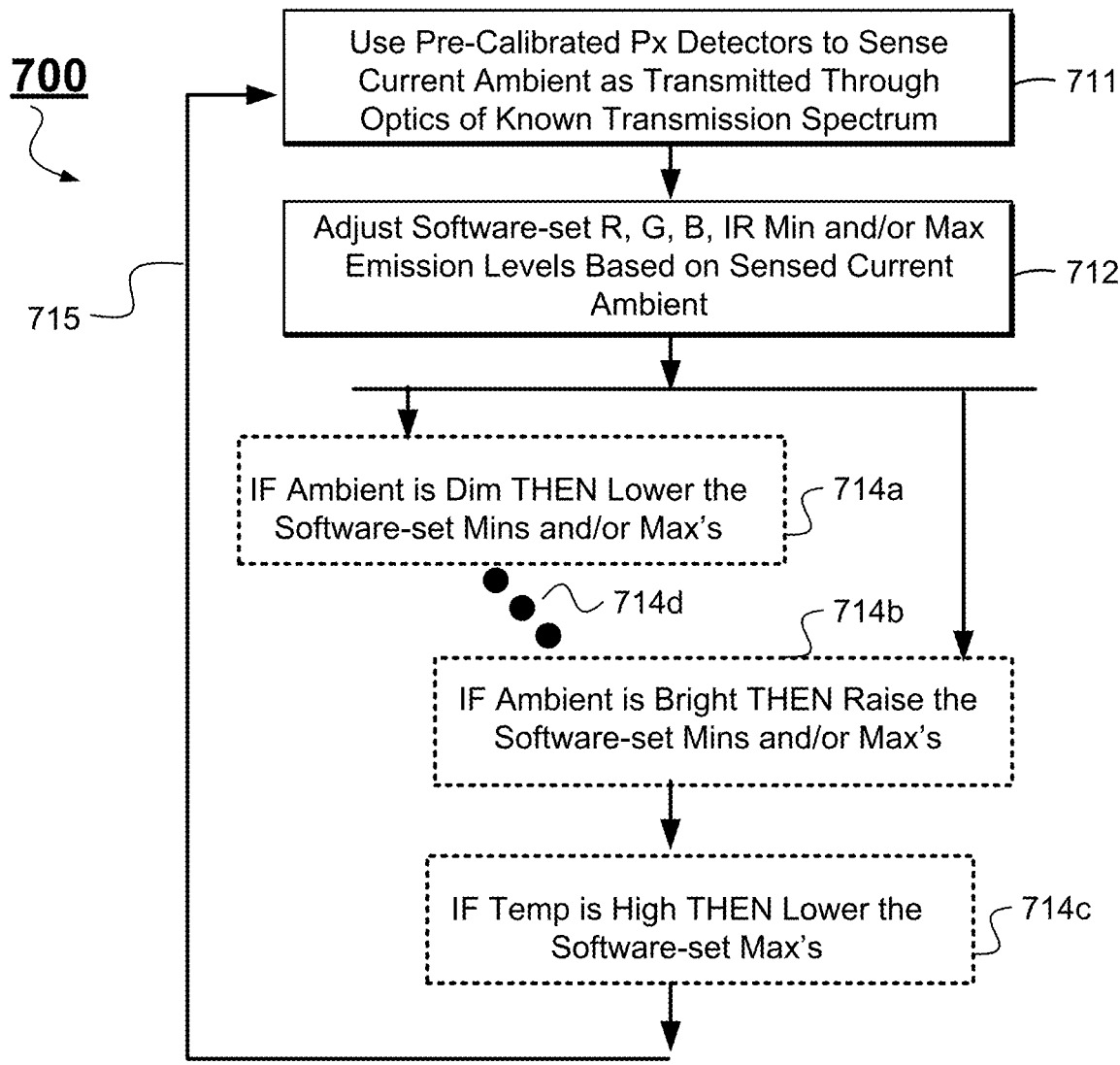
FIG. 7 is a process flow diagram which illustrates software established minimums and maximums for output light intensities.

Referring to FIG. 7, a flow chart is shown for a method 700 of adjusting the minimum and maximum brightness outputs of the LEDic's using the pre-calibrated proximity detector IC (Px). At step 711, the detector (Px) is used to sense the current ambient lighting condition (460) based on the portion of the ambient lighting 460 which passes through the optics layer 403 (FIG. 4A) where the bandpass transmission characteristics of that optics layer are predetermined. In step 712, and based on the known bandpass transmission characteristics of the optics layer 403, software defined minimums and maximums for the R, G, B output LEDs of the LEDic's are set. By way of example, although the hardware limits for the red light output intensity is in the range R=0 to R=255, the software defined range may be reset to Rmin=5 and Rmax=248. The same goes for the other LED color outputs, for example, Gmin=6 and Gmax=249; Bmin=7 and Bmax=250. In one embodiment, the ambient conditions sensed by the factory pre-calibrated photodetectors of the proximity detector IC (Px) may also be used to establish a software defined level of intensity for the output IR pulses of the proximity detector. Power can be saved if ambient noise is relatively low and the intensity of the output IR pulses can be correspondingly lowered. Similarly, and as indicated in sub step 714*a*, if the visible portion of the ambient lighting is sensed to be relatively dim, then the software may automatically lower the software set Min's and Max's for the respective output light intensities. On the other hand, and as indicated in sub step 714*b*, if the visible portion of the ambient lighting is sensed to be relatively bright, then the software may automatically and correspondingly increase the software set Min's and Max's for the respective output light intensities. In one embodiment, each puck sensor 100 includes a temperature sensor for detecting heat level inside the sensor assembly (e.g., at surface 401*a* of FIG. 4A). If the temperature is detected to be above a predetermined threshold, then the software may temporarily lower the software-set Min's and Max's for the respective output light intensities until the interior of the sensor assembly cools down as is indicated at step 714*c*. After a predetermined amount of waiting time, control returns to step 711 for resampling the ambient conditions and adjusting the software-set Min's and Max's accordingly.

Figure 8:
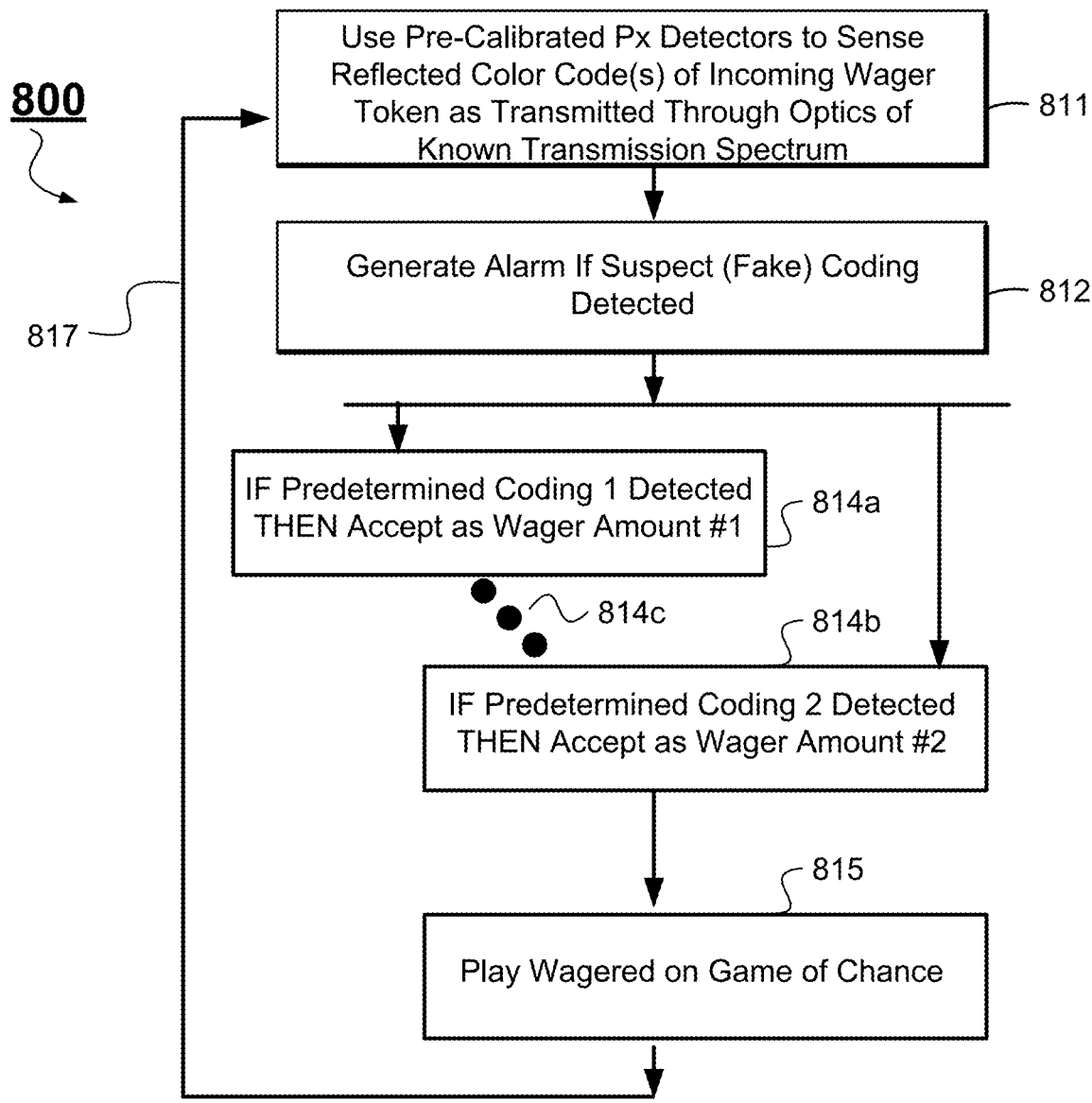
FIG. 8 is a process flow diagram which illustrates the detection of different kinds of wagering tokens.

Referring to FIG. 8, a flow chart is shown for a method 800 of automatically detecting the placement of casino-authorized wagering tokens. At step 811, the pre-calibrated Px detector's are used to sense the reflected color coding lights of incoming wager tokens (e.g., 430) as such lights are passed through the optics 403 having known transmission bandwidths. In one embodiment, the casino-authorized colors for the token rims 437 and/or the token undersides 438 are predetermined. If an incoming token is detected to not have the appropriate number and/or relative widths of and/or appropriate relative spacings between color coded bands of the incoming token, an alarm may be generated at step 812 due to the detection of a suspect wagering token. Otherwise, if the token is determined to be authentic, one of state determined further steps 814*a*, 814*c*, 814*b* may be taken. For example if a predetermined token coding identified as Coding #1 is detected by the pre-calibrated Px detector, then the software accepts the placed token as representing a first wagering amount denoted as Amount #1 in step 814*a*. If a predetermined token coding identified as Coding #2 is detected by the pre-calibrated Px detector, then the software accepts the placed token as representing a second wagering amount denoted as Amount #2 in step 814*b*. And so on. In subsequent step 815, the wagered upon game of chance is played based on the accepted token amounts. Then as a time window opens up for placement of yet further wagers, control is returned to step 811 for repeat of the process.

Because physical instantiations of signals representing information and program instructions may be employed to implement the systems/methods described herein, the present disclosure of invention relates to tangible (non-transitory) machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure of invention has been particularly shown and described with reference to specific embodiments thereof, it will be understood by those skilled in the art that changes in the form and details of the disclosed embodiments may be made without departing from the spirit or scope of the present teachings. It is therefore intended that the disclosure be interpreted to include all variations and equivalents that fall within the true spirit and scope of the present teachings.

What is claimed is:

1. A machine-assisted method of managing a game of chance played by one or more players at a gaming table having plural betting positions, the method comprising:
    while a predetermined first time window is open for receiving at least a first wager of the game, using a respective pre-calibrated proximity detecting integrated circuit (Px IC) provided at each respective betting position of the gaming table to automatically detect if a corresponding optically encoded and then acceptable first wager token has been placed over the respective Px IC of each one of the respective betting positions as the respective first wager for that betting position, each of the respective Px IC's having capability to detect and distinguish among different hand gestures made spaced apart from and proximate to the respective Px IC and to detect and identify optically encoded wager tokens placed over the respective Px IC;
    at closing of the predetermined first time window, causing a respective plurality of multi-colored light emitters disposed adjacent to the respective Px IC and provided at each of the respective betting positions where placement of a corresponding first wager token has been detected by the respective Px IC to output a respective first of differently colored light patterns, the first light pattern indicating at least to the respective player of that respective betting position that the corresponding first wager has been automatically accepted as having been timely placed at that respective betting position by way of a then acceptable first wager token; and
    using the respective Px IC of at least one of the betting positions to detect a hand gesture made spaced apart from and proximate to that respective Px IC.

2. The machine-assisted method of claim 1 wherein the respective plurality of multi-colored light emitters at each respective betting position is distributed among at least two annular zones adjacent to and surrounding the respective Px IC of that respective betting position such that each annular zone is populated by and thereby substantially defined by a corresponding subset of the respective plurality of multi-colored light emitters respectively distributed within a respective one of the at least two annular zones.

3. The machine-assisted method of claim 2 wherein the at least two annular zones are circular and concentric relative to the Px IC.

4. The machine-assisted method of claim 2 wherein there are at least three annular zones populated by and thereby substantially defined by corresponding subsets of the respective plurality of multi-colored light emitters.

5. The machine-assisted method of claim 1 wherein the respective plurality of multi-colored light emitters at each respective betting position is constituted by multi-color LEDs embedded in smart lighting integrated circuits (LEDic's) that are each structured to receive a self-clocking serial command signal, consume a portion of the received serial command signal and output a remainder of the received serial command signal for optional receipt by a next such LEDic in a serial chain of such LEDic's.

6. The machine-assisted method of claim 5 wherein the respective plurality of multi-colored light emitters at each respective betting position is constituted by at least 16 such LEDic's.

7. The machine-assisted method of claim 6 wherein the respective plurality of multi-colored light emitters at each respective betting position is constituted by at least 48 such LEDic's.

8. The machine-assisted method of claim 7 wherein the at least 48 LEDic's are mounted on a substantially circular printed circuit board having a diameter of less than 3 inches.

9. The machine-assisted method of claim 6 wherein the respective LEDic's at each respective betting position are interconnected as at least two independent serial chains.

10. The machine-assisted method of claim 1 wherein detections performed by each respective Px IC include detecting proximity of an approaching object to the respective Px IC using a plurality of IR detecting photodiodes provided in the respective Px IC and detecting coloration of the approaching object using a plurality of visible light detecting photodiodes provided in the respective Px IC.

11. The machine-assisted method of claim 1 and further comprising:
    while a predetermined second time window of the game is open for receiving at least a second wager, using the respective Px IC provided at each respective betting position to automatically detect if a corresponding optically encoded and then acceptable second wager token has been placed at one or more of the respective betting positions as a then acceptable second wager; and
    at closing of the predetermined second time window, causing the respective plurality of multi-colored light emitters provided at each of the respective betting positions where placement of a corresponding and then acceptable second wager token has been detected by the respective Px IC to output a respective light pattern indicating that the corresponding second wager has been accepted at that respective betting position.

12. The machine-assisted method of claim 11 and further comprising:
while the game is still ongoing but after all time windows for receiving wagers of the game are closed, causing the respective plurality of multi-colored light emitters provided at each of the respective betting positions to signal to their respective players and by way of a respectively colored light pattern that no more wagers can be accepted for the game.

13. The machine-assisted method of claim 12 and further comprising:
after a first round of playing the game completes and a second round begins, causing the respective plurality of multi-colored light emitters provided at each of the respective betting positions to signal to their respective players that new wagers can now be accepted for the second round.

14. The machine-assisted method of claim 11 and further comprising:
while the game is still ongoing and a hand gesture is called for at one of the betting positions, causing the respective plurality of multi-colored light emitters provided at the one betting position to signal to the respective player of the one betting position that a hand gesture is called for at the one betting position.

15. The machine-assisted method of claim 14 wherein:
the using of the respective Px IC of at least one of the betting positions to detect a hand gesture includes using that respective Px IC to detect the called-for hand gesture.

16. The machine-assisted method of claim 15 wherein the Px IC detected hand gesture is a gesture that includes directional movement in a 3D region proximate to the Px IC.

17. The machine-assisted method of claim 15 wherein the Px IC is disposed under a semi-opaque optics layer.

18. The machine-assisted method of claim 1 wherein at least one of the differently colored light patterns persistently uses a first color for each player for indicating to that player that an input is not currently acceptable at the player's betting position thereby training the player to associate the first color with an intuitive understanding that an input is not currently acceptable at the player's betting position.

19. The machine-assisted method of claim 18 wherein at least a second of the differently colored light patterns persistently uses a second color for each player for indicating to that player that an input is currently acceptable at the player's betting position thereby training the player to associate the second color with an intuitive understanding that an input is currently acceptable at the player's betting position.

20. The machine-assisted method of claim 19 wherein the first color is red and the second color is green.

21. The machine-assisted method of claim 1 wherein the Px IC has at least three connections to external circuitry, at least one of the connections carrying digital output data.

22. A machine system for managing a game of chance played by one or more players at a gaming table having plural betting positions, the system comprising at each respective betting position:
color-distinguishing wager placement detecting means for automatically detecting if a corresponding color encoded and first wager token has been placed at the respective betting position as the first wager while a predetermined first time window is open for receiving at least a first wager of the game, the wager placement detecting means including a respective pre-calibrated proximity detecting integrated circuit (Px IC) having capability to detect and distinguish among different hand gestures made spaced apart from and proximate to the respective Px IC and to detect and identify optically encoded wager tokens placed over the respective Px IC; and
game state signaling means, disposed adjacent to the color-distinguishing wager placement detecting means and configured for signaling to the player of the respective betting position and by way of a corresponding first of differently colored light patterns that a corresponding first wager token has been detected and accepted, the game state signaling means including a respective plurality of multi-colored light emitters operable to output the differently colored light patterns.

23. The machine system of claim 22 wherein the respective plurality of multi-colored light emitters at each respective betting position is distributed among at least two annular zones so that each annular zone is populated by and thereby substantially defined by a corresponding subset of the respective plurality of multi-colored light emitters.

24. The machine system of claim 23 wherein the at least two annular zones of each betting position are circular and concentric relative to the respective Px IC of the corresponding betting position.

25. The machine system of claim 23 wherein there are at least three annular zones populated by corresponding subsets of the respective plurality of multi-colored light emitters.

26. The machine system of claim 22 wherein the respective plurality of multi-colored light emitters at each respective betting position is constituted by multi-color LEDs embedded in smart lighting integrated circuits (LEDic's) that are each structured to receive a self-clocking serial command signal, consume a portion of the received serial command signal and output a remainder of the received serial command signal for optional receipt by a next such LEDic in a serial chain of such LEDic's.

27. The machine system of claim 26 wherein the respective plurality of multi-colored light emitters at each respective betting position is constituted by at least 48 such LEDic's.

28. The machine system of claim 27 wherein the at least 48 LEDic's are mounted on a substantially circular printed circuit board having a diameter of less than 3 inches.

29. The machine system of claim 22 wherein at each respective betting position, a respective and integrated combination of the color-distinguishing wager placement detecting means and of the game state signaling means is securely fastened to the gaming table.

30. The machine system of claim 29 wherein at each respective betting position, a respective cup-shaped cover is screwed vertically upward from underneath the gaming table to surround and securely fasten to the gaming table, the respective integrated combination of the color-distinguishing wager placement detecting means and the game state signaling means of the respective betting position.

31. A non-transitory computer readable storage having machine executable instructions recorded therein for use in managing a game of chance played by one or more players at a gaming table having plural betting positions, the recorded instructions causing a corresponding machine system to perform a method, comprising:

automatically performing detection of an input, the detection occurring while a predetermined first time window is open for receiving at least a first wager of a first round of the game and the detection using a respective pre-calibrated proximity detecting integrated circuit (Px IC) provided at each respective betting position to automatically detect if a corresponding first wager token has been placed at one or more of the respective betting positions as the first wager, wherein the respective Px IC has capability to detect and distinguish among different hand gestures made spaced apart from and proximate to the respective Px IC and to detect and identify optically encoded wager tokens placed over the respective Px IC; and automatically signaling by use of a first of differently colored light patterns and to one or more of the players at closing of the predetermined first time window, the signaling using a respective plurality of multi-colored light emitters disposed adjacent to and surrounding the respective Px IC provided at each of the respective betting positions where placement of a corresponding first wager token has been detected, the signaling including outputting the first of the differently colored light patterns from each respective plurality of multi-colored light emitters at a betting position where the detection of the first wager token has occurred, the signaling indicating that the corresponding first wager has been accepted at that respective betting position.

* * * * *